United States Patent
Su et al.

(10) Patent No.: US 9,544,146 B2
(45) Date of Patent: Jan. 10, 2017

(54) IMAGE PROCESSING APPARATUS, BIOMETRIC AUTHENTICATION APPARATUS, IMAGE PROCESSING METHOD AND RECORDING MEDIUM

(75) Inventors: Leiming Su, Tokyo (JP); Yukio Hoshino, Kanagawa (JP); Yukio Itakura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 605 days.

(21) Appl. No.: 13/143,446

(22) PCT Filed: Jan. 21, 2010

(86) PCT No.: PCT/JP2010/050734
§ 371 (c)(1),
(2), (4) Date: Jul. 6, 2011

(87) PCT Pub. No.: WO2010/084927
PCT Pub. Date: Jul. 29, 2010

(65) Prior Publication Data
US 2011/0273554 A1    Nov. 10, 2011

(30) Foreign Application Priority Data
Jan. 22, 2009 (JP) ................. 2009-012427

(51) Int. Cl.
*H04N 7/18* (2006.01)
*H04L 9/32* (2006.01)
(Continued)

(52) U.S. Cl.
CPC ............. *H04L 9/3231* (2013.01); *G06F 21/32* (2013.01); *G06K 9/0061* (2013.01)

(58) Field of Classification Search
CPC .......................... G06K 9/00597; G06K 9/0061; G06K 9/6205; G06K 9/4633; G06F 21/32; H04L 9/3231
(Continued)

(56) References Cited

U.S. PATENT DOCUMENTS 6,732,046 B1 *  5/2004  Joshi ............... G01C 21/26
                                              345/442
7,416,302 B2 *  8/2008  Tisse ............... G06K 9/00268
                                              351/205
(Continued)

FOREIGN PATENT DOCUMENTS

JP      3307936 B     7/2002
JP    2003164431 A    6/2003
(Continued)

OTHER PUBLICATIONS

Harvey, Circle Hough Transform, Last Modified, Oct. 10, 1999, on line:   https://www.cis.rit.edu/class/simg782.old/talkHough/HoughLecCircles.html.*

(Continued)

*Primary Examiner* — William C Vaughn, Jr.
*Assistant Examiner* — Naod Belai

(57) ABSTRACT

Interlace noises of the image of an iris included in the image of an eye picked up through an interlaced scheme are corrected precisely within a short time. An image processing apparatus (30) corrects a digital image P based on only low-brightness pixels configuring the image of a pupil included in the digital image P of an eye. Accordingly, interlace noises included in the image of the pupil of the eye and that of the iris can be corrected precisely within a short time. Next, a checking apparatus (50) performs authentication on a subject person based on the image of the iris specified based on the corrected digital image P. Hence, precise authentication is enabled.

6 Claims, 26 Drawing Sheets

(51) Int. Cl.
*G06F 21/32* (2013.01)
*G06K 9/00* (2006.01)

(58) Field of Classification Search
USPC .................................... 348/78, 178; 382/17
See application file for complete search history.

(56) References Cited

U.S. PATENT DOCUMENTS

| | | | | |
|---|---|---|---|---|
| 2003/0218691 A1* | 11/2003 | Gray | ............... | H04N 7/012 348/448 |
| 2006/0147094 A1* | 7/2006 | Yoo | ............... | G06K 9/00604 382/117 |
| 2006/0262965 A1* | 11/2006 | Sugita | ............... | G06K 9/00597 382/117 |
| 2007/0036396 A1* | 2/2007 | Sugita | ............... | G06K 9/00597 382/117 |
| 2007/0160266 A1* | 7/2007 | Jones | ............... | G06K 9/0061 382/117 |
| 2007/0160267 A1* | 7/2007 | Jones | ............... | G06K 9/0061 382/117 |
| 2009/0219439 A1* | 9/2009 | Sellers | ............... | H04N 7/012 348/452 |
| 2010/0074477 A1* | 3/2010 | Fujii | ............... | G06K 9/00604 382/117 |

FOREIGN PATENT DOCUMENTS

| | | |
|---|---|---|
| JP | 2008029467 A | 2/2008 |
| JP | 2008141648 A | 6/2008 |
| WO | 2005008590 A | 1/2005 |

OTHER PUBLICATIONS

International Search Report for PCT/JP2010/050734 mailed Feb. 23, 2010.

\* cited by examiner

IMAGE PROCESSING APPARATUS, BIOMETRIC AUTHENTICATION APPARATUS, IMAGE PROCESSING METHOD AND RECORDING MEDIUM

The present application is the National Phase of PCT/JP2010/050734, filed Jan. 21, 2010, which is based on a Japanese Patent Application No. 2009-012427 filed on Jan. 22, 2009. The entire specification, claims and drawings of Japanese Patent Application No. 2009-012427 are herein incorporated in this specification by reference.

TECHNICAL FIELD

The present invention relates to an image processing apparatus, a biometric authentication apparatus, an image processing method and a recording medium, and more specifically, an image processing apparatus that executes an image processing on a digital image of an eye, a biometric authentication apparatus that executes authentication using the pattern of an iris, an image processing method for executing an image processing on a digital image of an eye, and a computer-readable recording medium that stores a program which causes a computer to execute an image processing on a digital image of an eye.

BACKGROUND ART

Recently, instead of a code or a password that is a combination of characters and symbols, biometric authentication technologies that execute authentication using the physical characteristics of a subject person are actively researched and developed. It is typical that biometric authentication uses physical characteristics which are not consistent one another among individuals, such as a fingerprint, a venous pattern on the back of a hand, an iris pattern of an eye, and a voiceprint. In particular, authentication apparatuses using a fingerprint and a venous pattern on the back of a hand have the authentication precision improved, and are built in various devices, such as an ATM (Automatic Teller Machine) and a personal computer (PC) together with the advancement of the cost-down of the authentication apparatuses.

According to the authentication using a fingerprint and a venous pattern on the back of a hand, however, it is necessary for a subject person to contact a part of the body like a finger and a hand to the apparatus or to put those close to the apparatus. Hence, in recent days, biometric authentication technologies using an iris pattern of an eye are getting attention (see, for example, Patent Literature 1).

PRIOR ART DOCUMENT

Patent Literature

Patent Literature 1: Japanese Patent Publication No. 3307936

DISCLOSURE OF INVENTION

Problem to be Solved by the Invention

It is known that an eyeball of a human is always having a micromotion involuntary while gazing an object standing still. This is a physiological phenomenon, so-called involuntary eye movement. Hence, when an image of an eye of a subject person is picked up by an interlaced digital camera, etc., the image may have the iris or the outer edge of a pupil jiggled.

Accordingly, in order to perform authentication using an iris pattern of an eye highly precisely, it is necessary to appropriately correct the jiggled image due to the involuntary eye movement.

Moreover, regarding the biometric authentication process, in general, promptness on some level is necessary. Accordingly, it is preferable that the above-explained correction should be promptly executed.

The present invention has been made in view of the above-explained circumstances, and it is an object of the present invention to provide an apparatus, etc., which can perform correction on an image picked up through an interlaced scheme within a short time and highly precisely.

Means for Solving the Problem

In order to achieve the above object, an image processing apparatus according to a first aspect of the present invention corrects an image of an eye defined by a plurality of lines belonging to a first line group and a second line group located adjacent to each other, the image being picked up through an interlaced scheme and the image processing apparatus includes: a calculating unit which moves the second line group relative to the first line group predetermined amount by predetermined amount, and which calculates, for each pixel belonging to the first line group among pixels configuring an image of a pupil of the eye, a difference in brightness between a pixel belonging to the first line group among pixels configuring the image of the pupil of the eye and a pixel belonging to the second line group and adjacent to the pixel belonging to the first line group; an integrating unit that integrates brightness differences calculated pixel by pixel; and a correcting unit that corrects misalignment between the first line group and the second line group based on a relative displacement of the second line group to the first line group when an absolute value of an integrated value obtained by the integrating unit becomes minimum.

A biometric authentication apparatus according to a second aspect of the present invention performs authentication using a pattern of an iris, and includes: an image pickup apparatus that picks up a digital image of an eye; the image processing apparatus according to the present invention and which executes a correction process on the digital image; and a processing apparatus that performs biometric authentication using the digital image corrected by the image processing apparatus.

An image processing method according to a third aspect of the present invention corrects a digital image of an eye defined by a plurality of lines belonging to a first line group and a second line group located adjacent to each other, the image being picked up through an interlaced scheme and the image processing method includes: a step of moving the second line group relative to the first line group predetermined amount by predetermined amount, and of calculating, for each pixel belonging to the first line group among pixels configuring an image of a pupil of the eye, a difference in brightness between a pixel belonging to the first line group among pixels configuring the image of the pupil of the eye and a pixel belonging to the second line group and adjacent to the pixel belonging to the first line group; a step of integrating brightness differences calculated pixel by pixel; and a step of correcting misalignment between the first line group and the second line group based on a relative displacement of the second line group to the first line group when an absolute value of an integrated value of the brightness differences becomes minimum.

A recording medium according to a fourth aspect of the present invention stores a program that causes a computer to function as: a calculating means which moves a second line group relative to a first line group of a digital image of an eye defined by a plurality of lines belonging to the first line group and the second line group located adjacent to each other predetermined amount by predetermined amount, the image being picked up through an interlaced scheme, and which calculates, for each pixel belonging to the first line group among pixels configuring an image of a pupil of the eye, a difference in brightness between a pixel belonging to the first line group among pixels configuring the image of the pupil of the eye and a pixel belonging to the second line group and adjacent to the pixel belonging to the first line group; an integrating means that integrates brightness differences calculated pixel by pixel; and a correcting means that corrects misalignment between the first line group and the second line group based on a relative displacement of the second line group to the first line group when an absolute value of an integrated value of the brightness differences becomes minimum.

Effect of the Invention

According to the present invention, it is possible to perform correction on an image picked up through an interlaced scheme within a short time and highly precisely.

BEST MODE FOR CARRYING OUT THE INVENTION

<<First Embodiment>>

Figure 1:
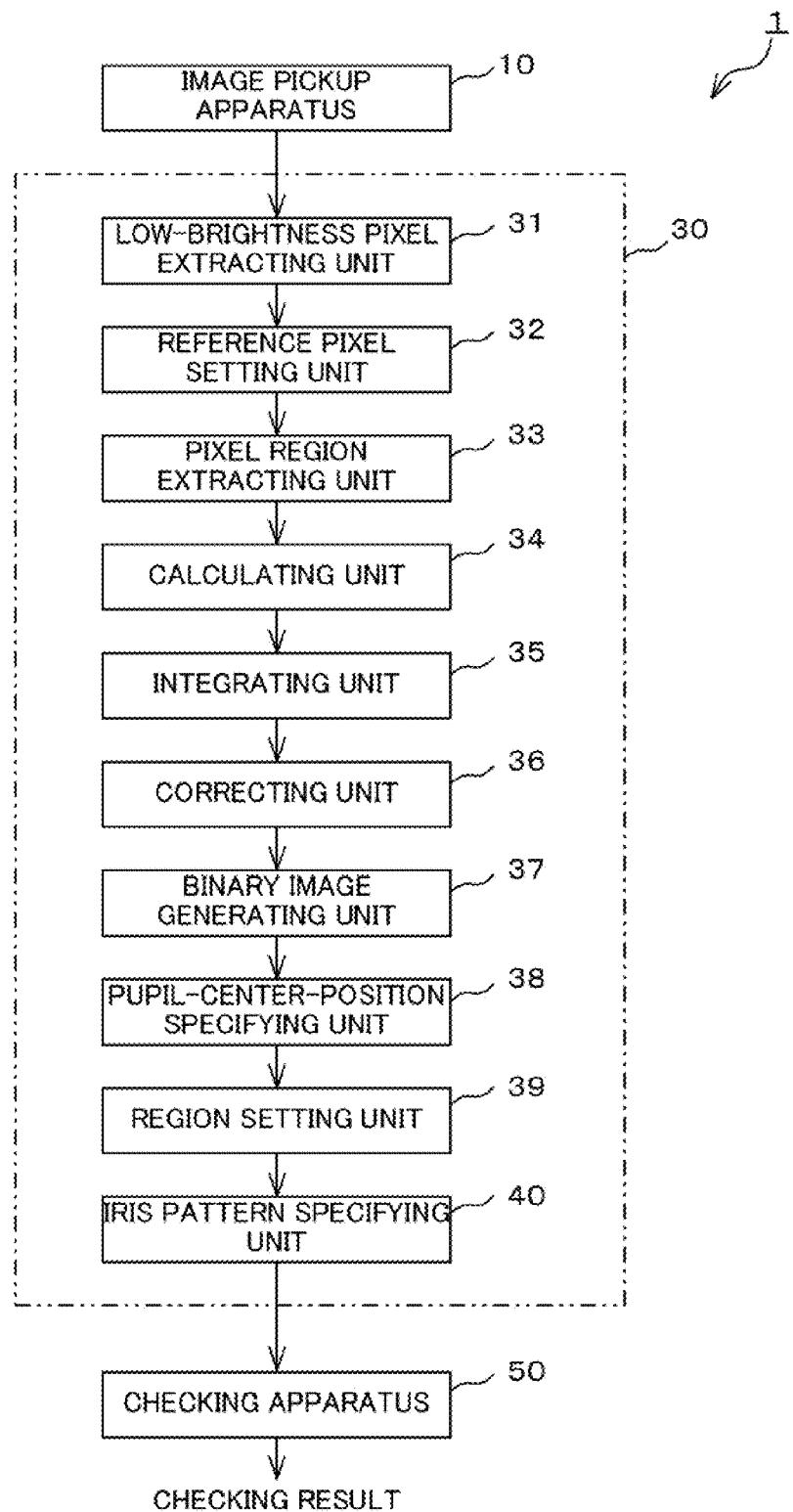
FIG. 1 is a block diagram showing a general configuration of a biometric authentication apparatus according to a first embodiment of the present invention.

An explanation will be given of a first embodiment of the present invention with reference to FIGS. 1 to 23. FIG. 1 is a block diagram showing a general configuration of a biometric authentication apparatus 1 according to the present embodiment. The biometric authentication apparatus 1 performs authentication using an iris pattern of a subject person. The biometric authentication apparatus 1 includes an image pickup apparatus 10, an image processing apparatus 30, and a checking apparatus 50.

The image pickup apparatus 10 includes a digital camera that has a lighting device that emits illumination light including, for example, near infrared rays, and an infrared filter which cuts visible rays other than infrared rays. Moreover, the digital camera is a camera that records an image through an interlaced scheme.

Figure 2:
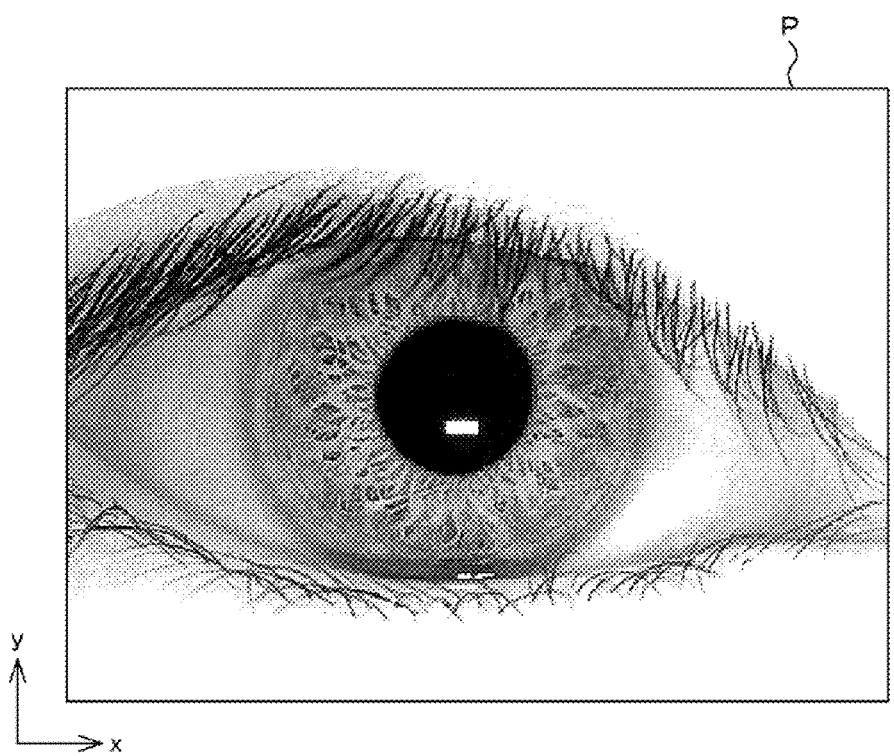
FIG. 2 is a diagram showing a digital image.

The image pickup apparatus 10 outputs a digital image obtained by picking up an image of an eye of the subject person to the image processing apparatus 30. FIG. 2 shows a digital image P that is an illustrative digital image picked up by the image pickup apparatus 10. As can be seen from FIG. 2, the image pickup apparatus 10 picks up at least images of an iris of the subject person, and portions of an eyelid and eyelashes present around the iris. Moreover, the image pickup apparatus 10 picks up an image using infrared ray, so that the digital image P is a gray-scale image.

Figure 3:
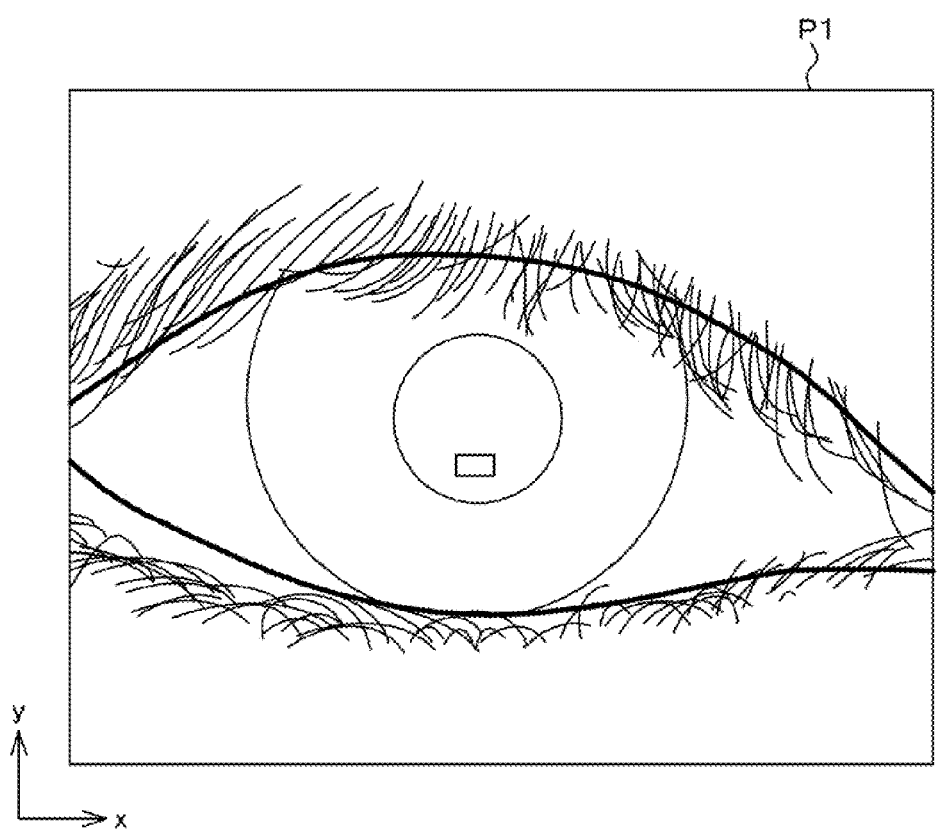
FIG. 3 is a diagram showing an image representing and showing the digital image simplified.

An image P1 shown in FIG. 3 is an image that represents, for the digital image P, the contours of the iris and a portion present therearound indicated by lines in a simplified manner. In the following explanation, the explanation will be given with reference to the digital image P and the explanation will also be given with reference to the image P1 corresponding to the digital image P as needed. Moreover, regarding an image like the digital image P, an explanation will be given with an xy coordinate system with the horizontal direction of paper being as an x axis direction and the vertical direction of the paper being as a y axis direction as needed.

Returning to FIG. 1, the image processing apparatus 30 includes a low-brightness pixel extracting unit 31, a reference pixel setting unit 32, a pixel region extracting unit 33, a calculating unit 34, an integrating unit 35, a correcting unit 36, a binary image generating unit 37, a pupil-center-position specifying unit 38, a region setting unit 39, and an iris pattern specifying unit 40.

The low-brightness pixel extracting unit 31 extracts a low-brightness pixel having a brightness equal to or smaller than a predetermined value among a plurality of pixels configuring the digital image P output by the image pickup apparatus 10. Extraction of a low-brightness pixel is carried out by converting the digital image P into a binary image and by extracting a pixel having a brightness that is 0 at this time. As an example, FIG. 4 shows a binary image P2 obtained by performing image conversion on the digital image P using a predetermined threshold.

Figure 4:
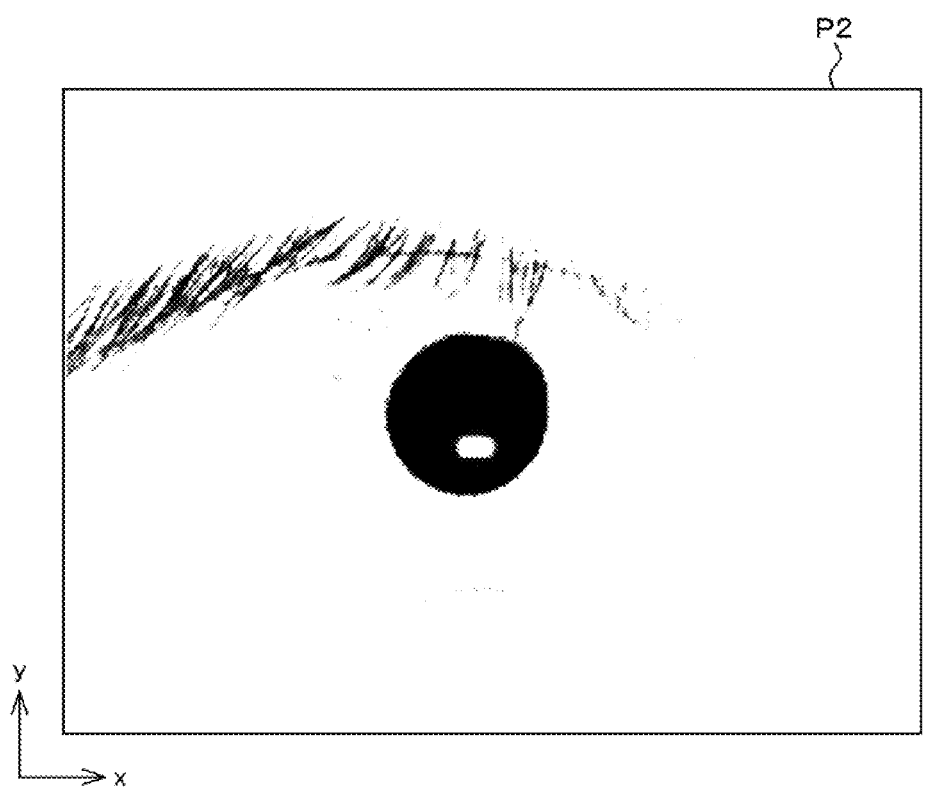
FIG. 4 is a diagram showing a binary image.

The low-brightness pixel extracting unit 31 extracts low-brightness pixels configuring the black part of the binary image P2 shown in FIG. 4, and outputs information including the extraction result to the reference pixel setting unit 32.

The threshold used by the low-brightness pixel extracting unit 31 can be set based on an image pickup condition of the digital image P, etc. In the present embodiment, the threshold is set so that pixels configuring an image of an iris appear as high-brightness pixels and the pixels configuring an image of a pupil appear as low-brightness pixels. By setting the threshold in this fashion, in the binary image P2, pixels that mainly configure images of a pupil and an eyelid appear as low-brightness pixels.

The reference pixel setting unit 32 successively selects the extracted low-brightness pixels, and gives, for example, a value 1 to each of the plurality of pixels located within a predetermined distance from the selected low-brightness pixel. This operation will be explained below with reference to FIG. 5 that shows a sample image SAMP1.

Figure 5:
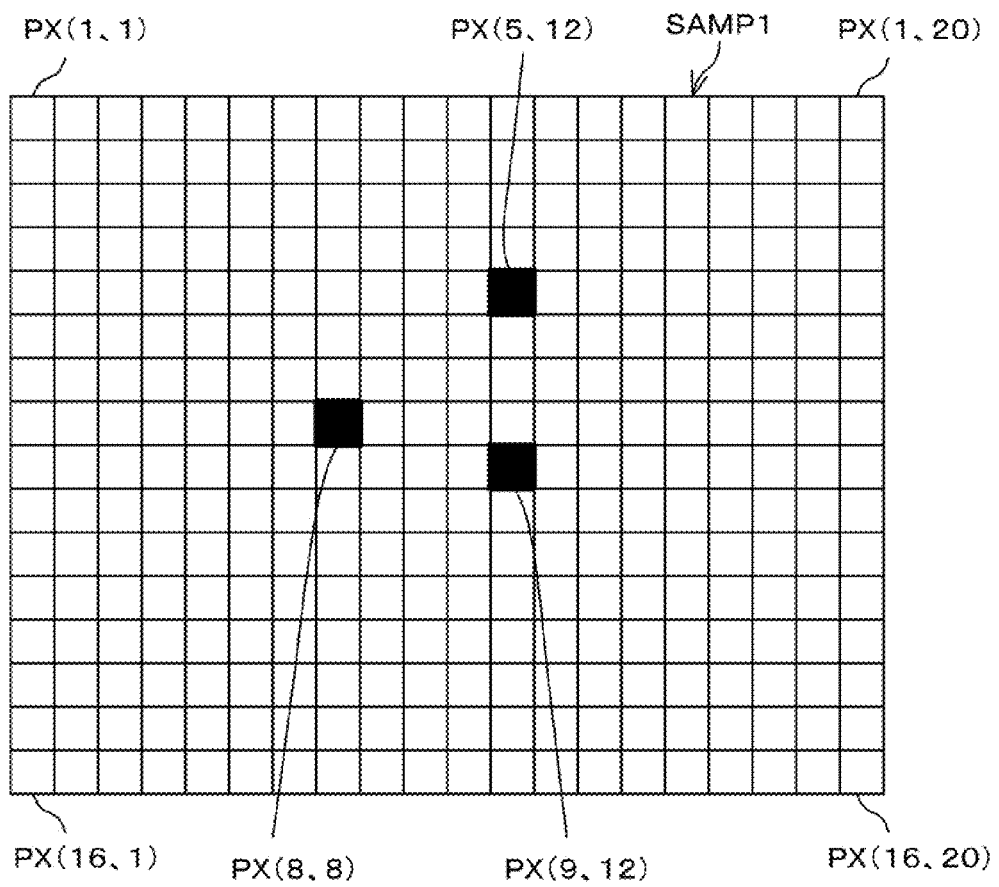
FIG. 5 is a diagram showing a sample image.
Figure 6A:
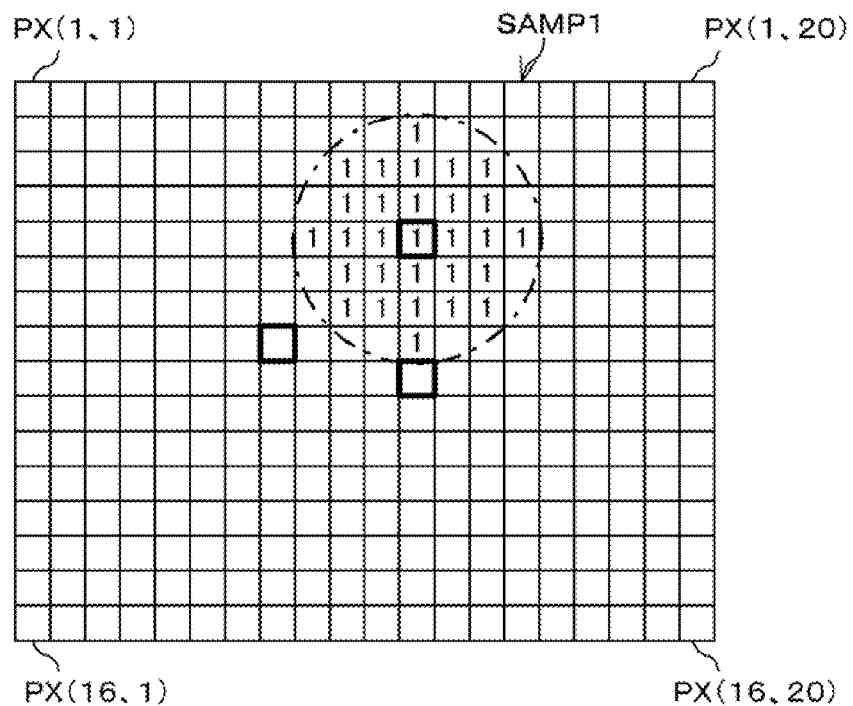
FIG. 6A is a (first) diagram for explaining an operation of a reference pixel setting unit.

As shown in FIG. 5, the sample image SAMP1 is an image including pixels PX (m, n) arranged in a matrix manner that is 16 rows by 20 columns as an example. m is an integer indicating the row number from 1 to 16, and n is an integer indicating the column number from 1 to 20. The sample image SAMP1 is a binary image including three low-brightness pixels PX (5, 12), PX (8, 8), and PX (9, 12) and other high-brightness pixels PX. Accordingly, the low-brightness pixel extracting unit 31 extracts the three low-brightness pixels PX (5, 12), PX (8, 8) and PX (9, 12). The reference pixel setting unit 32 first selects the low-brightness pixel PX (5, 12) at the fifth row. Next, as shown in FIG. 6A, the reference pixel setting unit 32 gives a value 1 to the low-brightness pixel PX (5, 12) and each of the pixels PX (m, n) located within a predetermined distance from the low-brightness pixel PX (5, 12).

Figure 6B:
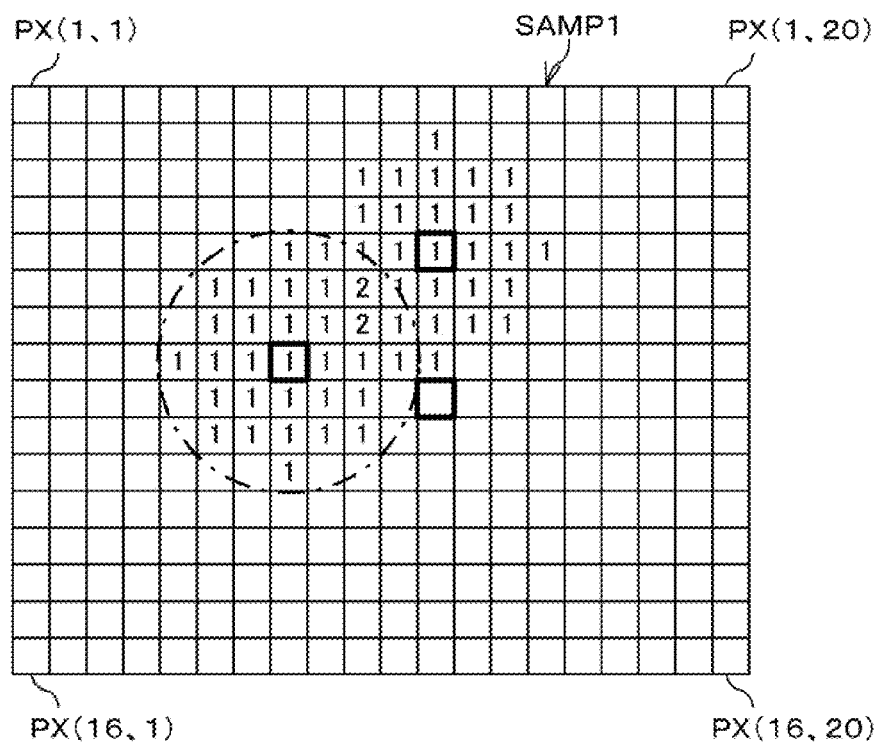
FIG. 6B is a (second) diagram for explaining an operation of the reference pixel setting unit.

Next, the reference pixel setting unit 32 selects the low-brightness pixel PX (8, 8) at the eighth row. As shown in FIG. 6B, the reference pixel setting unit 32 gives a value 1 to the low-brightness pixel PX (8, 8) and each of the pixels PX (m; n) located within the predetermined distance from the low-brightness pixel PX (8, 8). The pixel PX (6, 10) at the sixth row and the pixel PX (7, 10) at the seventh row are located within the predetermined distance from both low-brightness pixel PX (5, 12) and low-brightness pixel PX (8, 8). Hence, the reference pixel setting unit 32 integrates the values given to each of those pixels PX (6, 10) and PX (7, 10) so far. At a time point when this process completes, the pixels PX (6, 10) and PX (7, 10) have an integrated value of the given values which is 2.

Figure 7:
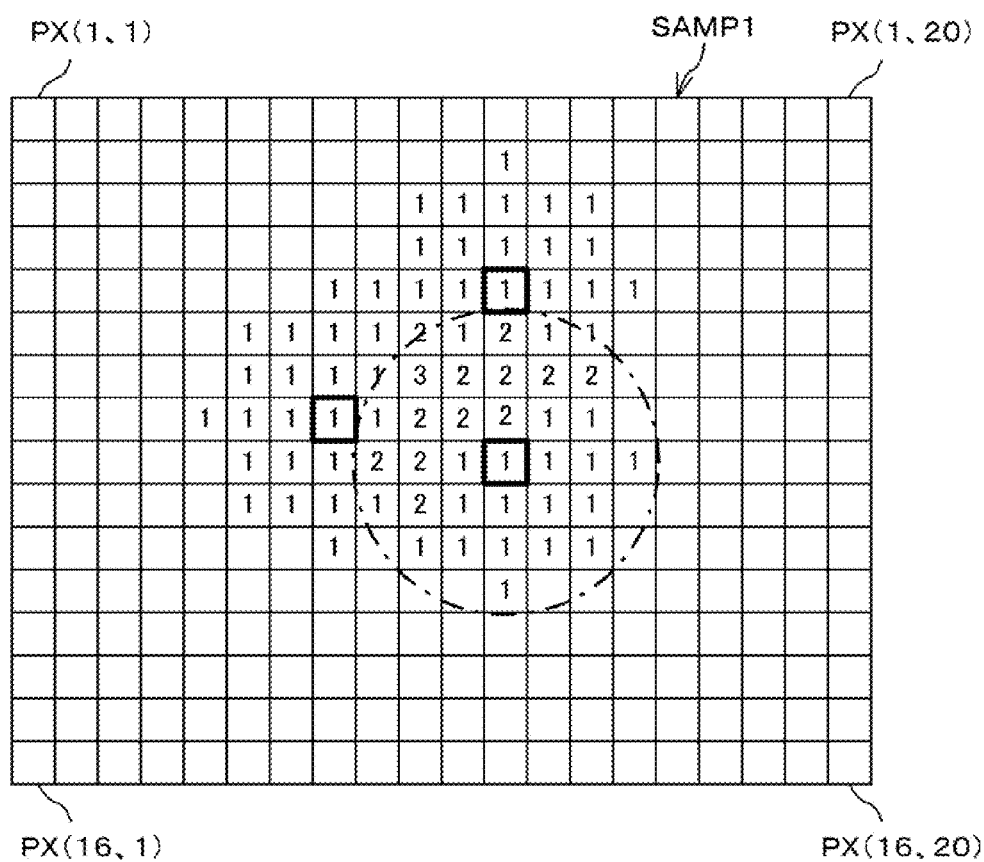
FIG. 7 is a (third) diagram for explaining an operation of the reference pixel setting unit.

Next, the reference pixel setting unit 32 selects the low-brightness pixel PX (9, 12) at the ninth row. Next, as shown in FIG. 7, the reference pixel setting unit 32 gives a value 1 to the low-brightness pixel PX (9, 12) and each of the pixels PX located within the predetermined distance from the low-brightness pixel PX (9, 12). The pixel PX (7, 10) at the seventh row is located within the predetermined distance from all of the low-brightness pixels PX (5, 12), PX (8, 8), and PX (9, 12). Hence, the reference pixel setting unit 32 integrates the values given to the pixel PX (7, 10) so far. At a time point when this process completes, the pixel PX (7, 10) has an integrated value of the given values which is 3. The reference pixel setting unit 32 executes the above-explained process on all of the low-brightness pixels included in the image. Accordingly, an integrated value of the given values is calculated for each pixel PX (m, n).

Figure 8:
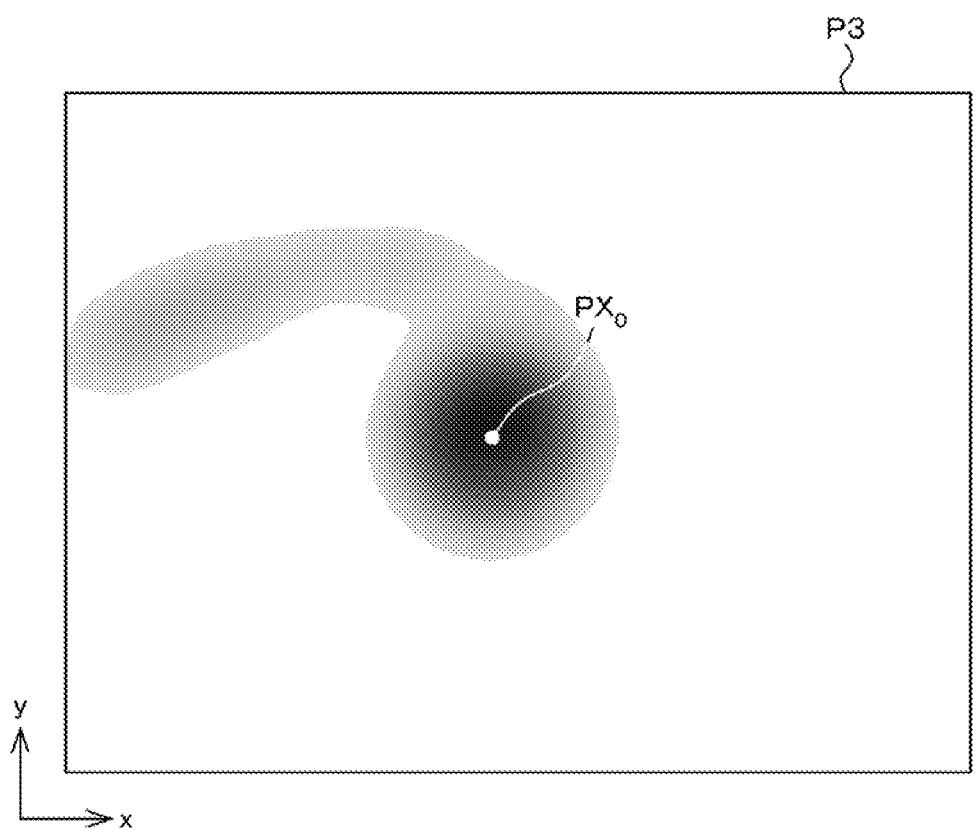
FIG. 8 is a diagram showing an image obtained by the reference pixel setting unit.

In the image processing apparatus 30, the reference pixel setting unit 32 performs the above-explained process on each low-brightness pixel configuring the binary image P2. FIG. 8 shows an image P3 that is an illustrative image conceptually representing a result after the reference pixel setting unit 32 performs the above-explained process on the low-brightness pixels configuring the black part of the binary image P2. In the image P3, the greater the integrated value of the values given by the reference pixel setting unit 32 is, the darker the pixel is colored.

Figure 9:
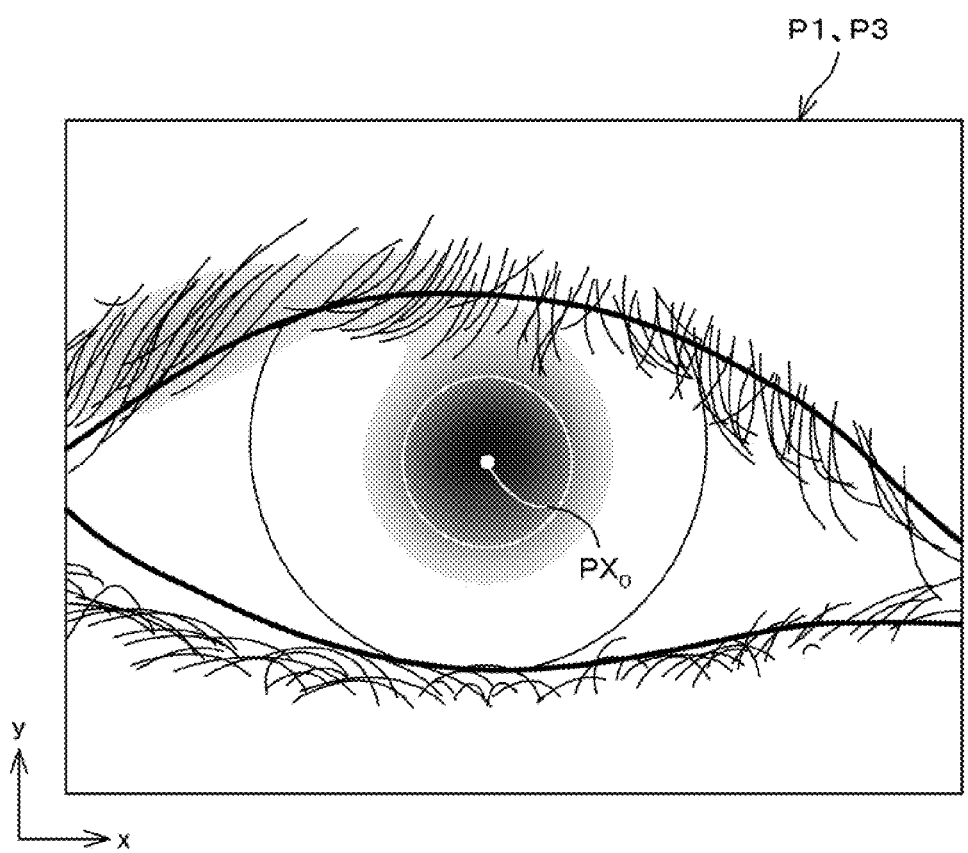
FIG. 9 is a diagram showing an image for explaining a process result by the reference pixel setting unit.

Next, the reference pixel setting unit 32 sets a pixel having the largest integrated value of the given values as a reference pixel $PX_0$, and outputs positional information of the reference pixel $PX_0$ to the pixel region extracting unit 33. As shown in FIG. 8, the reference pixel $PX_0$ matches the position of a pixel indicated by the highest concentration in the image P3. Moreover, FIG. 9 shows the image P1 (see FIG. 3) and the image P3 (see FIG. 8) superimposed together. As shown in FIG. 9, the position of the reference pixel $PX_0$ substantially matches the center of the pupil of an eye shown in the image P1.

Figure 10:
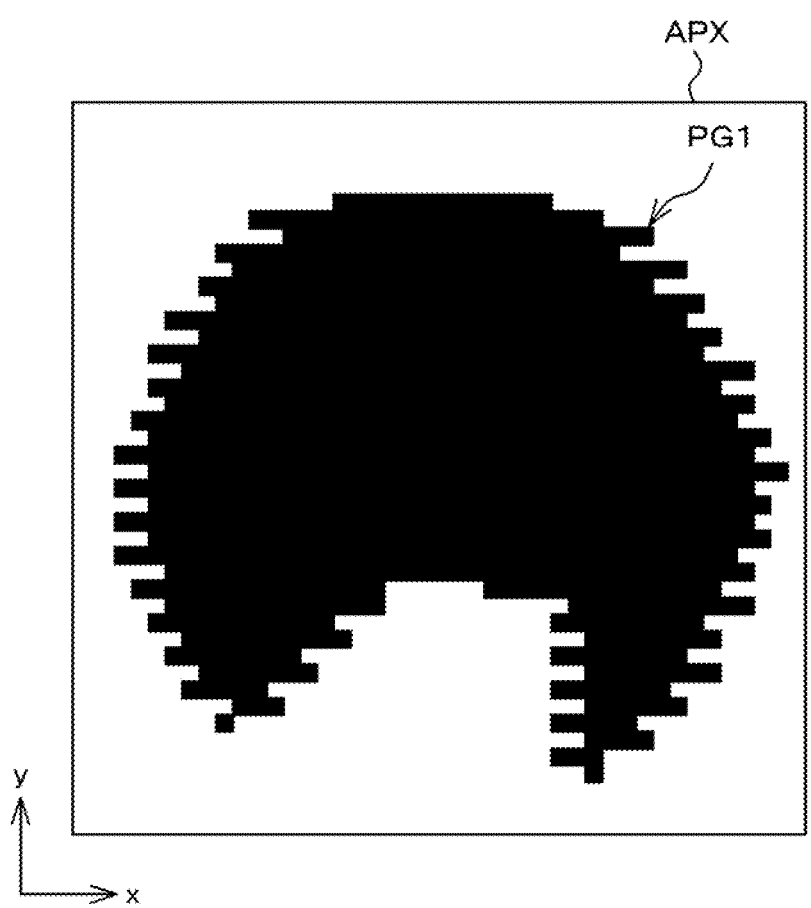
FIG. 10 is a diagram exemplary showing a region including a low-brightness pixel group.

FIG. 10 is a diagram exemplary (without considering brightness information) showing a region APX including a low-brightness pixel group PG1 configuring the image of the pupil and extracted from the digital image P. The pixel region extracting unit 33 extracts, around the reference pixel $PX_0$, the region APX including the low-brightness pixel group PG1 configuring the image of the pupil among the low-brightness pixels included in the digital image P.

Figure 11:
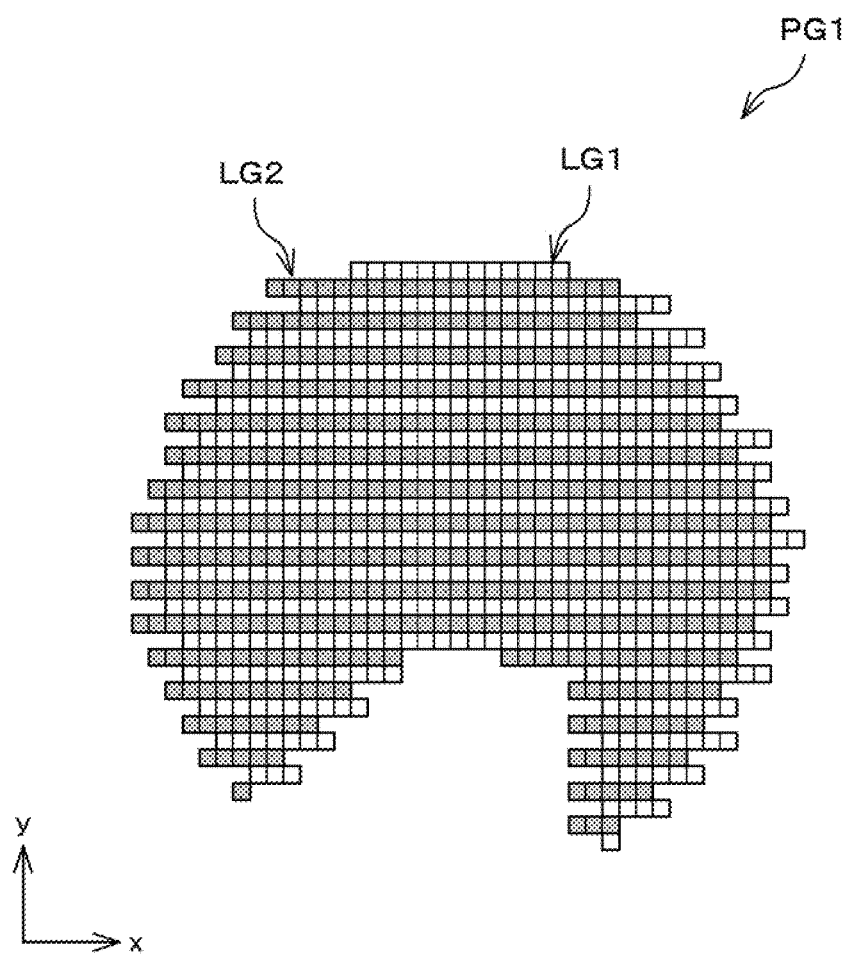
FIG. 11 is a diagram showing a positional relationship between a first line group and a second line group before correction.

The low-brightness pixel group PG1 shown in FIG. 10 is a pixel group configuring the image of the pupil that includes comb-teeth like noises at the outer edges at the +x side and the −x side because of the involuntary eye movement in the horizontal direction (the x axis direction) of the eyeball. As shown in FIG. 11, the low-brightness pixel group PG1 includes low-brightness pixels belonging to a first line group LG1 having a plurality of lines formed by square pixels arranged side by side in the X axis direction and low-brightness pixels belonging to a second line group LG2.

When the image of the eye of the subject person is picked up by the image pickup apparatus 10 of the present embodiment, pieces of information on pixels belonging to the first line group LG1 are obtained at first, and pieces of information on pixels belonging to the second line group LG2 are obtained next. Hence, when the eyeball moves while the image of the eye of the subject person is picked up, a misalignment of information between the first line group LG1 and the second line group LG2 is caused. Accordingly, the image processing apparatus 30 causes the calculating unit 34, the integrating unit 35, and the correcting unit 36 to work together, thereby correcting (hereinafter, simply referred to as an interlace correction) the misalignment of information between the first line group LG1 and the second line group LG2. An explanation will be below given of the interlace correction.

Figure 12A:
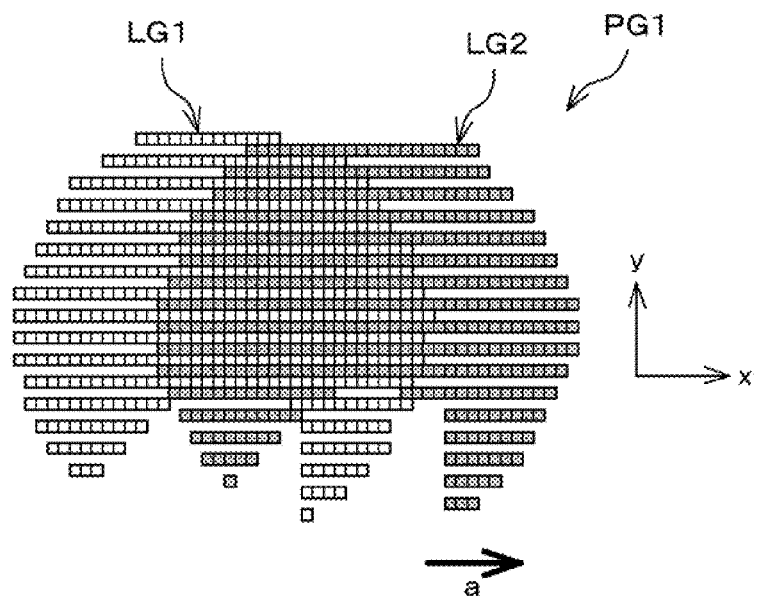
FIG. 12A is a (first) diagram for explaining an operation of a calculating unit.
Figure 12B:
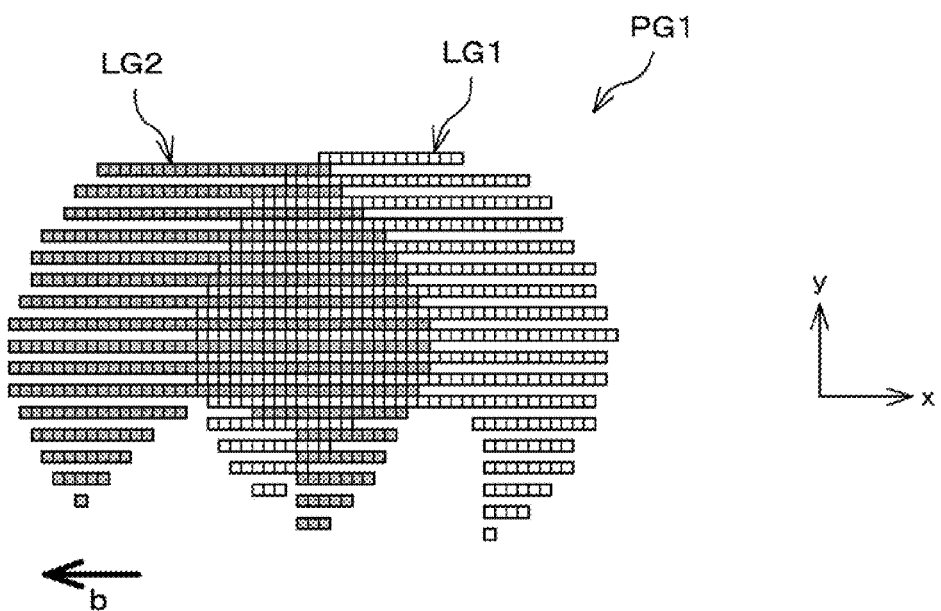
FIG. 12B is a (second) diagram for explaining an operation of the calculating unit.

As shown in FIGS. 12A and 12B, the calculating unit 34 moves the second line group LG2 relative to the first line group LG1 from an initial state (a state shown in FIG. 1) in +x direction indicated by an arrow a or in −x direction indicated by an arrow b pixel by pixel. At the same time, the calculating unit 34 calculates, for each movement of the second line group by a pixel, a correlation value of each low-brightness pixel belonging to the first line group LG1 configuring the image of the pupil shown in FIG. 11.

Figure 13:
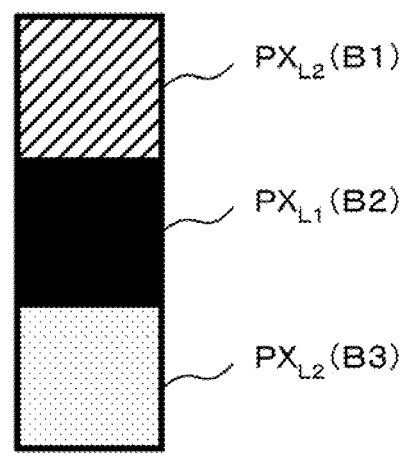
FIG. 13 is a diagram for explaining how to calculate a correlation value.
Figure 14:
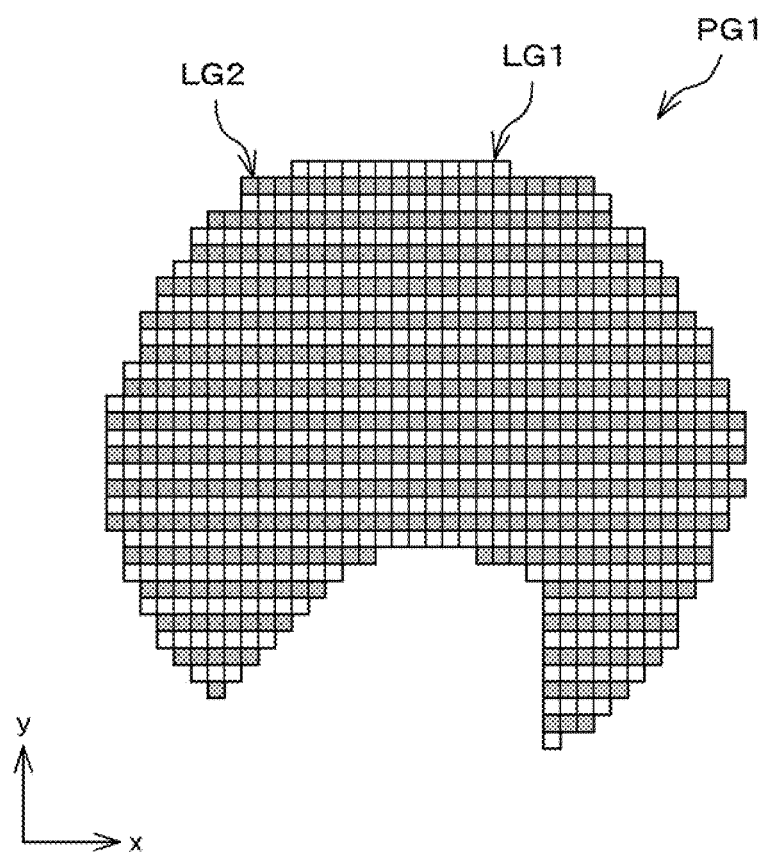
FIG. 14 is a diagram showing a positional relationship between the first line group and the second line group after correction.

As an example, FIG. 13 shows a pixel $PX_{L,2}$ (B1) and a pixel $PX_{L,2}$ (B3) belonging to the second line group LG2 and adjoining to a low-brightness pixel $PX_{L,1}$ (B2) belonging to the first line group LG1. Note that the pixel $PX_{L,2}$ (B1) and the $PX_{L,2}$ (B3) may be low-brightness pixels or high-brightness pixels case by case. Moreover, respective brightness of the low-brightness pixels $PX_{L,1}$ (B2), $PX_{L,2}$ (B1) and $PX_{L,2}$ (B3) are B2, B1, and B3.

The calculating unit 34 executes a calculation that is represented by a following formula (I) on each low-brightness pixel $PX_{L,1}$ (B2) belonging to the first line group LG1 using, for example, a differential filter {1, −2, 1}. Accordingly, a correlation value V corresponding to each low-brightness pixel $PX_{L,1}$ (B2) belonging to the first line group LG1 is calculated for each displacement of the second line group LG2 relative to the first line group LG1. The larger the brightness of the pixel $PX_{L,2}$ adjoining to the low-brightness pixel $PX_{L,1}$ is, the larger the correlation value V becomes.

$$V = 1 \cdot B1 - 2 \cdot B2 + 1 \cdot B3 \quad (1)$$

The integrating unit 35 integrates the correlation values V calculated for respective low-brightness pixels for each displacement of the second line group LG2 relative to the first line group LG1. Next, the integrating unit 35 associates an integrated value $V_A$ with a displacement d of the second line group LG2 relative to the first line group LG1, and outputs the associated value as an integrated value $V_A(d)$ to the correcting unit 36.

The correcting unit 36 selects the smallest one among the integrated values $V_A(d)$, and specifies the displacement d associated with this integrated value $V_A(d)$. Next, the correcting unit 36 moves the second line group LG2 relative to the first line group LG1 configuring the digital image P by a distance d, thereby correcting the digital image P. Accordingly, a misalignment of information between the first line group LG1 and the second line group LG2 is corrected, and pixels configuring the image of the pupil become a state shown in FIG. 14 from the state shown in FIG. 11. Moreover, it is not illustrated in the figure but when interlace noises are eliminated from the image of the pupil, interlace noises are also eliminated from the image of an iris. Thereafter, the image processing apparatus 30 causes each unit to execute a process based on the corrected digital image P.

The binary image generating unit 37 generates a binary image P4 from the corrected digital image P which is different from the binary image P2.

Figure 15:
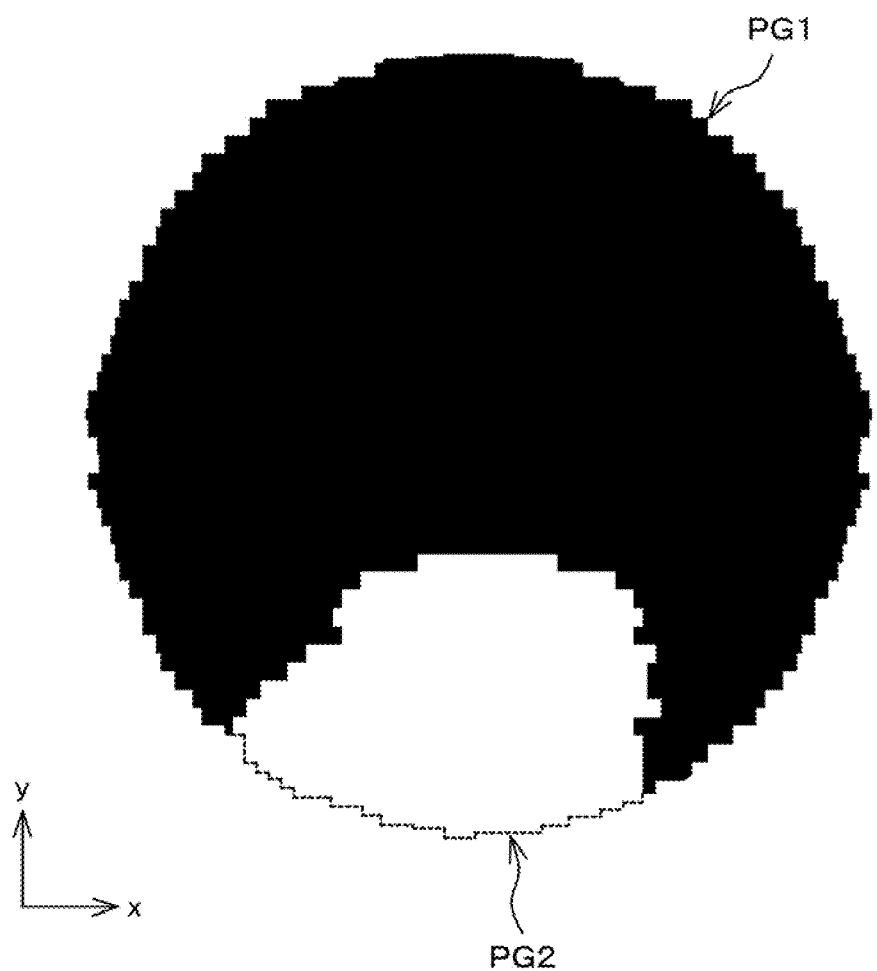
FIG. 15 is a diagram showing a low-brightness pixel group and a high-brightness pixel group both configuring a pupil.

Meanwhile, when an image of an eye including a pupil is picked up, because of the effect of reflected light from the surface of a horny coat of the eye, some pixels among the pixels configuring the pupil have a high brightness. Accordingly, the pixel groups configuring the pupil and appearing in the binary image P4 can be divided into two groups: a low-brightness pixel group PG1; and a high-brightness pixel group PG2. FIG. 15 shows illustrative low-brightness pixel group PG1 and high-brightness pixel group PG2 configuring the pupil included in the binary image P4. As shown in FIG. 15, in the present embodiment, the high-brightness pixel group PG2 is eccentrically present in the pixels configuring the image of the pupil, so that when the number of pixels configuring the high-brightness pixel group PG2 increases, the position of the reference pixel $PX_0$ may be gradually shifted from the center of the pupil. Hence, the image processing apparatus 30 detects the center position of the pupil based on the distribution of the low-brightness pixel group PG1 configuring the pupil in the binary image P4 and the positional information of the reference pixel $PX_0$.

Figure 16:
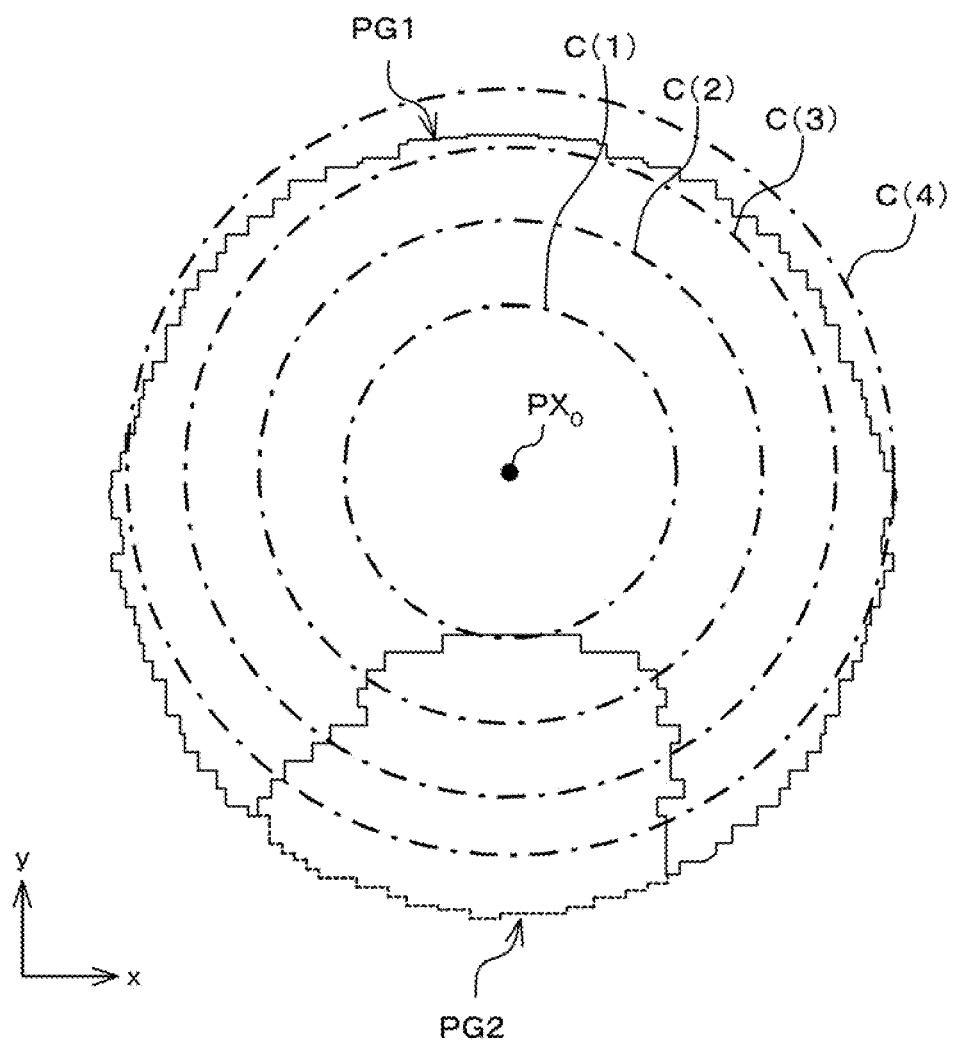
FIG. 16 is a (first) diagram for explaining an operation of a pupil-center-position specifying unit.

As shown in FIG. 16, the pupil-center-position specifying unit 38 sets a circle C(1) around the reference pixel $PX_0$. A radius r(1) of the circle C(1) is set so as to be sufficiently smaller than the radius of the pupil. For example, it is desirable that the radius r(1) of the circle C(1) should be set in consideration of the distribution range of the low-brightness pixel group PG1 in the X axis direction or in the Y axis direction.

Next, the pupil-center-position specifying unit 38 sets a circle C(2) around the reference pixel $PX_0$ having a larger radius than the radius r(1) of the circle C(1).

Next, the pupil-center-position specifying unit 38 calculates respective areas $S_1$ and $S_2$ of the circles C(1) and C(2), and the number of pixels $N_1$ and $N_2$ of low-brightness pixels present inwardly of respective circles C(1) and C(2). Thereafter, the pupil-center-position specifying unit 38 calculates a ratio $R_1$ of the number of low-brightness pixels in respective circles ($N_2-N_1$) relative to the difference in the areas of respective circles C(1) and C(2) ($S_2-S_1$). That is, $R_1=(N_2-N_1)/(S_2-S_1)$ is satisfied.

Next, the pupil-center-position specifying unit 38 determines whether or not the calculated ratio $R_1$ is equal to or larger than a predetermined value. When the determination result is positive, the pupil-center-position specifying unit 38 sets a circle C(3) having a larger radius than that of the circle C(2). Next, the pupil-center-position specifying unit 38 calculates respective areas $S_2$ and $S_3$ of the circles C(2) and C(3) and the number of low-brightness pixels $N_2$ and $N_3$ present inwardly of respective circles C(2) and C(3). Thereafter, the pupil-center-position specifying unit 38 calculates a ratio $R_2$ of the number of low-brightness pixels in respective circles ($N_3-N_2$) relative to the difference in the areas of respective circles C(2) and C(3) ($S_3-S_2$). That is, $R_2=(N_3-N_2)/(S_3-S_2)$ is satisfied.

The pupil-center-position specifying unit 38 determines whether or not the calculated ratio $R_2$ is equal to or larger than the predetermined value. Thereafter, the above-explained processes are repeated until a ratio $R_N$ equal to or less than the predetermined value is calculated. During this repetition, the two circles defined on the image of the pupil in the binary image P4 are caused to gradually increase respective sizes. The ratios $R_1$, $R_2$, etc., are collectively referred to as $R_N$.

During this repeating, when the ratio $R_N$ equal to or less than the predetermined value is calculated, the pupil-center-position specifying unit 38 specifies the center position of the pupil using a circle C(N) at this time. An explanation will be given of a case in which, as shown in FIG. 16, the circles C(1), C(2), and C(3) are within regions defined by the low-brightness pixel group PG1 and the high-brightness pixel group PG2, but a circle C(4) is out of such regions when the ratio $R_N$ equal to or less than the predetermined value is calculated.

The circles C(1), C(2), and C(3) include only pixels belonging to either one of the low-brightness pixel group PG1 and the high-brightness pixel group PG2 configuring the pupil. In this case, the ratio $R_N$ calculated becomes substantially constant. In contrast, the circle C(4) includes pixels other than the pixels belonging to the low-brightness pixel group PG1 and the high-brightness pixel group PG2 configuring the pupil. Those pixels are high-brightness pixels configuring the image of an iris. Hence, a number $N_4$ of the low-brightness pixels included in the circle C(4) decreases, and as a result, the calculated ratio $R_3$ ($=(N_4-N_3)/(S_4-S_3)$) becomes smaller than the predetermined value.

Figure 17:
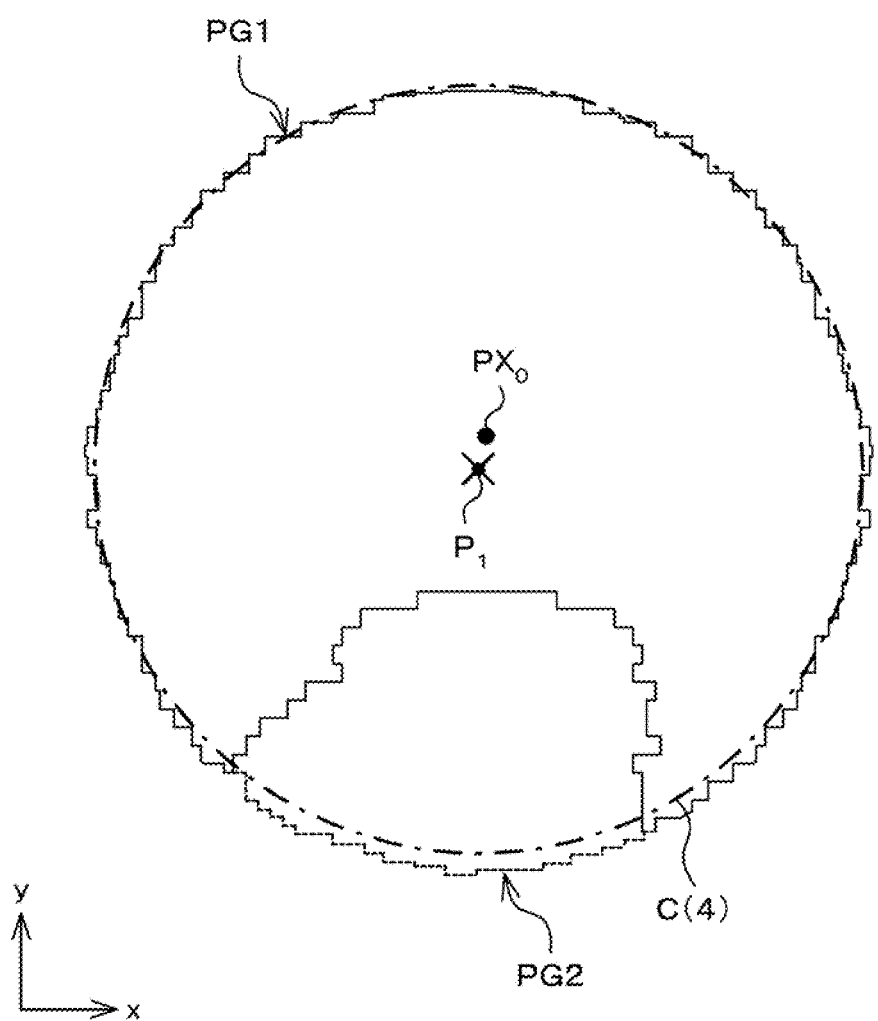
FIG. 17 is a (second) diagram for explaining an operation of the pupil-center-position specifying unit.

Next, as shown in FIG. 17, the pupil-center-position specifying unit 38 searches the center position $P_1$ of the circle C(4) when the number of low-brightness pixels included in the circle C(4) becomes maximum while moving the circle C(4) with reference to the reference pixel $PX_0$. Thereafter, the pupil-center-position specifying unit 38 specifies the searched position $P_1$ as the center position of the pupil.

It is desirable that setting should be made so that respective radii of the circles C(1) to C(N) differ by, for example, a pixel to several pixels with reference to the size of a pixel. The smaller the difference between the radius of a circle (N−1) and the radius of the circle C(N) is, the more the detection precision of the pupil center improves.

Figure 18:
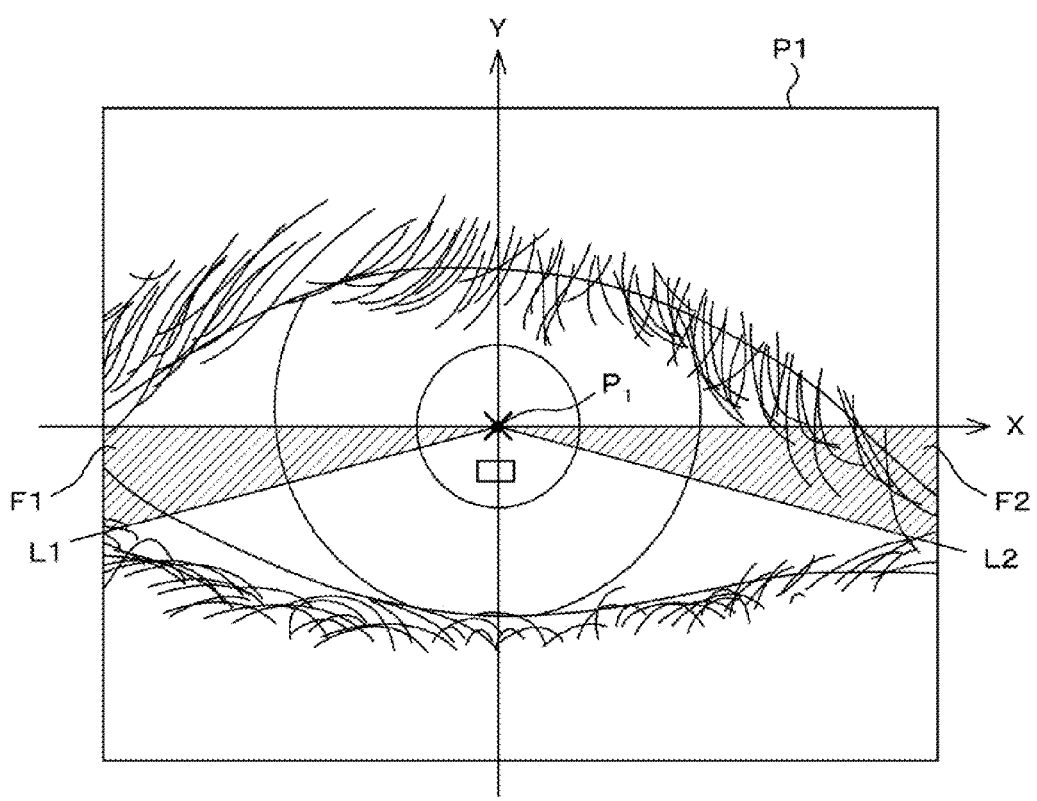
FIG. 18 is a (first) diagram for explaining an operation of a region setting unit.
Figure 19A:
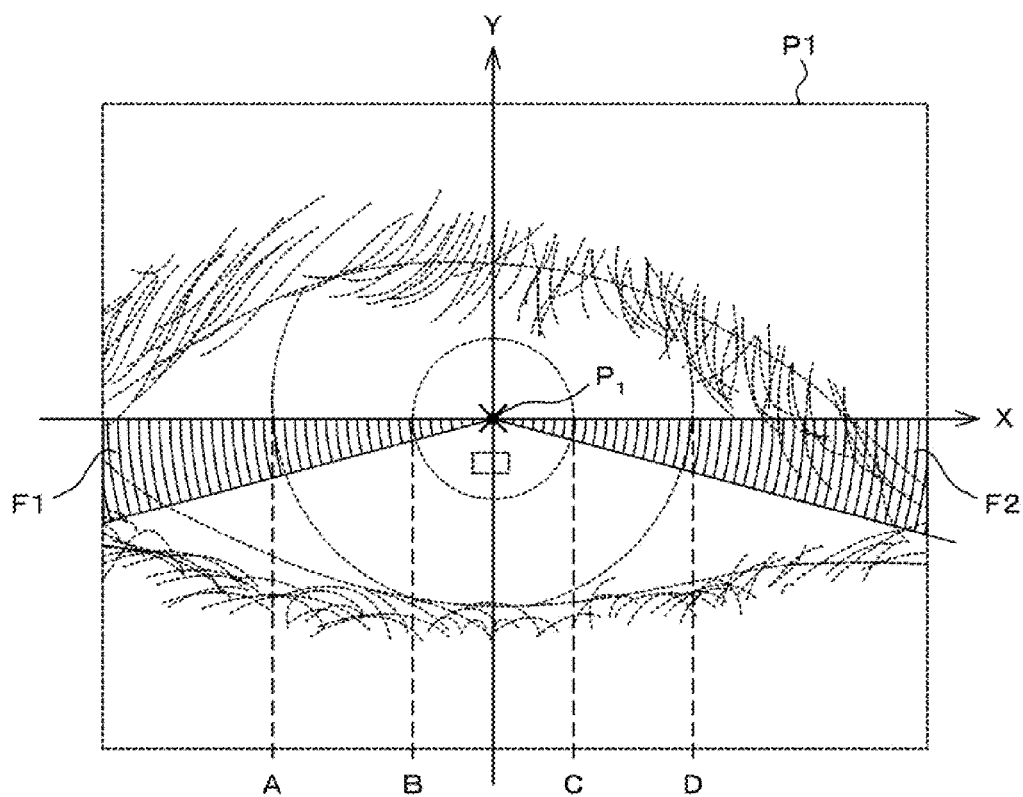
FIG. 19A is a (second) diagram for explaining an operation of the region setting unit.

As shown in FIG. 18, the region setting unit 39 defines an XY coordinate system with the position $P_1$ being an origin on the image P1. Next, the region setting unit 39 defines triangular regions F1 and F2 defined by straight lines L1 and L2 having an angle relative to the X axis which is 15 degrees with the position $P_1$ on the image P1 being as an origin. Thereafter, as shown in FIG. 19A, the region setting unit 39 divides the region F1 by a plurality of arcs having a central angle that is an angle defined by the X axis and the straight line L1, thereby setting a plurality of micro regions in an arcuate shape. Moreover, the region setting unit 39 divides the region F2 by a plurality of arcs having a central angle that is an angle defined by the X axis and the straight line L2, thereby setting a plurality of micro regions in an arcuate shape.

Figure 19B:
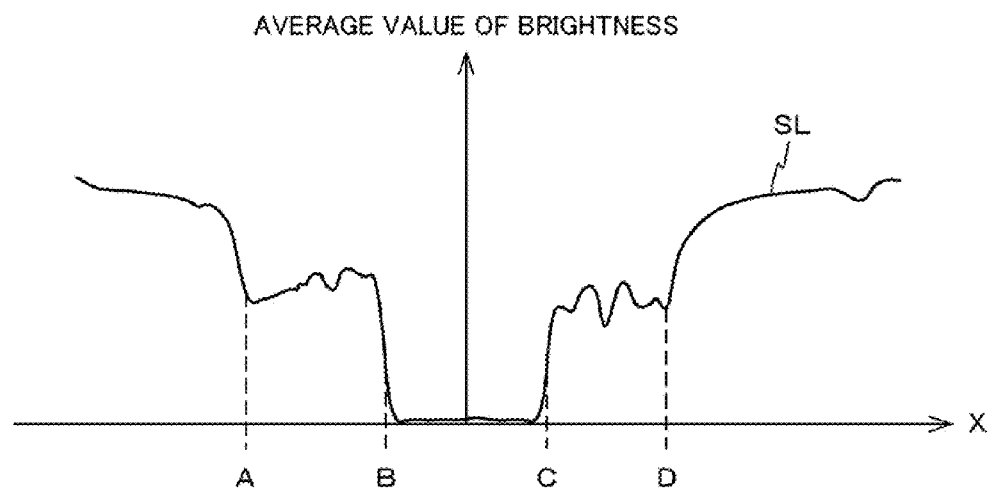
FIG. 19B is a diagram showing a characteristic curve SL.

FIG. 19B shows a characteristic curve SL indicating a relationship between a position x and an average value of the brightness of the arcuate micro regions. The iris pattern specifying unit 40 calculates an average value of the brightness of the pixels included in the micro region for each micro region belonging to the region F1 or the region F2. Next, the iris pattern specifying unit 40 calculates a characteristic curve SL indicating a relationship between a position of a micro region over the X axis and an average value of corresponding brightness. Thereafter, the iris pattern specifying unit 40 obtains X coordinates A and D of intersections each between the X axis and the outer edge of the iris based on the change level of the characteristic curve SL.

The X coordinates A, D of the intersections can be specified by comparing a differential value obtained by differentiating the characteristic curve SL by a position x over the X axis with a predetermined threshold. As is indicated by the characteristic curve SL in FIG. 19B, in general, there is successiveness in the change level of the average value of the brightness at a boundary between the iris region and the white part of the eye. Moreover, at a region changing from the region of the iris to the region of the white part of the eye, the change level of the average value of brightness is larger than those of other regions. By utilizing those features, the X coordinates A and D of the intersections each between the X axis and the outer edge of the iris can be substantially precisely obtained using the differential value of the characteristic curve SL. Note that X coordinates B and C are intersections each between the X axis and the outer edge of the pupil.

Figure 20:
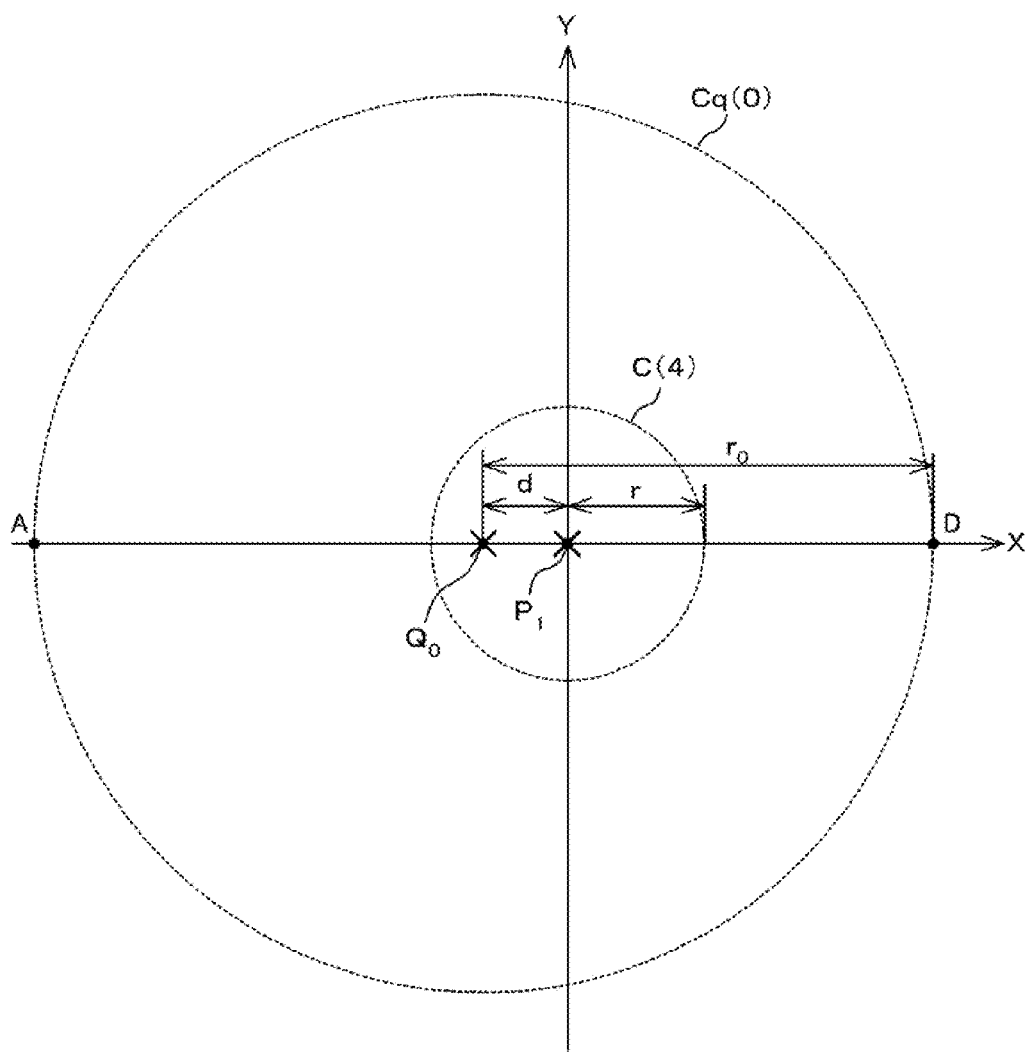
FIG. 20 is a diagram for explaining an operation of an iris pattern specifying unit.

As shown in FIG. 20, for example, a circle Cq(0) will be considered which has the center located over the X axis and has a circumference passing through a point (A, 0) and a point (D, 0) on the XY coordinate system. The circle Cq(0) is a circle having a radius (D−A)/2 around a point ((A+D)/2, 0) as a center $Q_0$. The circle Cq(0) is a circle having a radius (D−A)/2 around a point ((A+D)/2, 0) as a center $Q_0$. The circle Cq(0) substantially matches the outer edge of the iris, and the circle C(4) substantially matches the outer edge of the pupil. Hence, the iris pattern specifying unit 40 obtains the X coordinates A and D, thereby specifying a region defined by the circle C(4) and the circle Cq(0) around the position $P_1$ on the image P1 as a region where the image of the iris is present. Next, the iris pattern specifying unit 40 notifies the checking apparatus 50 of the specified result.

First, the checking apparatus 50 generates a code of a subject person subjected to a comparison based on the image of the iris specified by the iris pattern specifying unit 40.

As shown in FIG. 20, in general, the center P, of the circle C(4) substantially matching the outer edge of the pupil is not consistent with the center $Q_0$ of the circle Cq(0) substantially matching the outer edge of the iris. This is because, as the visual lines of the right and left eyes of a human are not parallel to each other because of a parallax in general, when the image of the eye is picked up from the front of the subject person, the optical axis of the lens (unillustrated) of the image pickup apparatus 10 and the visual line do not become parallel to each other. The iris is a spherical surface, so that the center of the iris and the center of pupil are misaligned in the digital image P picked up by the image pickup apparatus 10 having the optical axis of lens inclined relative to the visual line.

Figure 21:
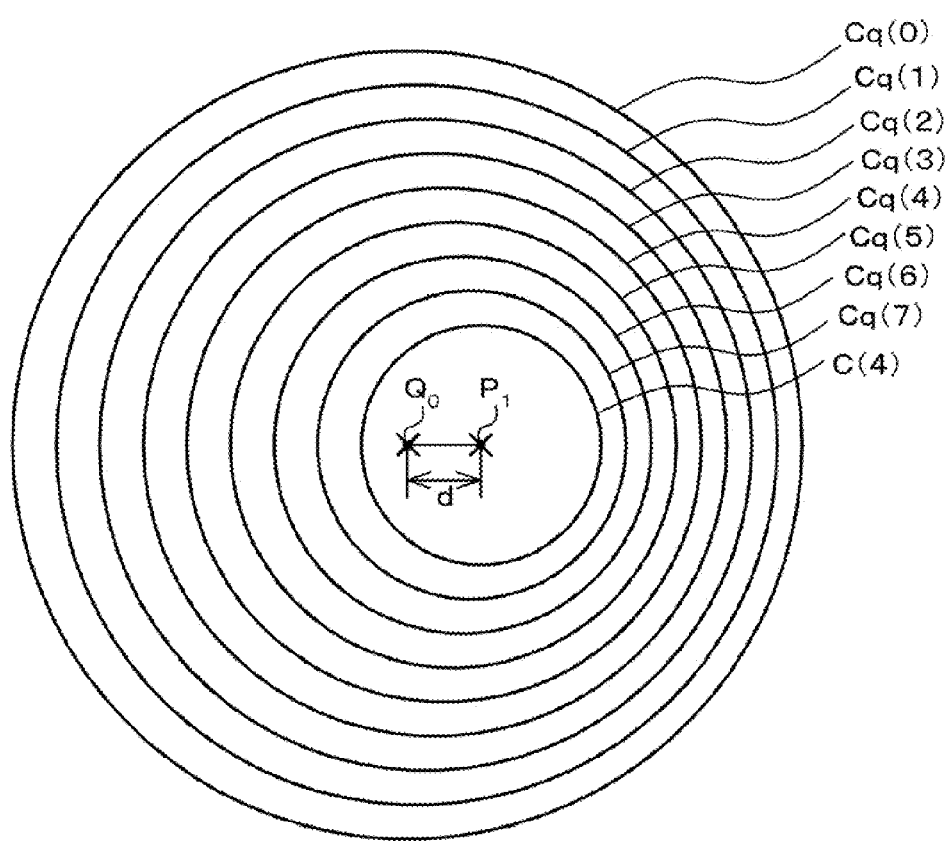
FIG. 21 is a (first) diagram for explaining an operation of a checking apparatus.

As shown in FIG. 21, the checking apparatus 50 divides a region defined by the circle C(4) substantially matching the outer edge of the pupil and the circle Cq(0) substantially matching the outer edge of the iris into eight annular regions using seven circles Cq(1) to Cq(7) in consideration of the above-explained circumstance. This operation will be concretely explained below.

First, the checking apparatus 50 measures a distance d from the center $P_1$ of the circle C(4) and the center $Q_0$ of the circle Cq(0). Next, the checking apparatus 50 calculates centers $Q_1$ to $Q_7$ of the circles Cq(1) to Cq(7) by respectively adding values obtained by dividing the distance d by 8 to the X coordinate of the center $Q_0$. Note the respective calculated coordinates of the centers $Q_1$ to $Q_7$ are $Q_1$ ((A+D)/2+d/8, 0), $Q_2$ ((A+D)/2+d/4, 0), $Q_3$ ((A+D)/2+3d/8, 0), $Q_4$ ((A+D)/2+d/2, 0), $Q_5$ ((A+D)/2+5d/8, 0), $Q_6$ ((A+D)/2+3d/4, 0). and $Q_7$ ((A+D)/2+7d/8, 0).

Next, the checking apparatus 50 calculates radii $r_1$ to $r_7$ of respective circles Cq(1) to Cq(7) by subtracting respective values, which are obtained by dividing a difference between the radius (hereinafter, referred to as r) of the circle C(4) and a radius $r_0$ of the circle Cq(0) by 8, from the radius $r_0$ of the circle Cq(0). Note that calculated radii $r_1$ to $r_7$ are $r_1$: $(r_0-(r_0-r)/8)$, $r_2$: $(r_0-2\cdot(r_0-r)/8)$, $r_3$: $(r_0-3\cdot(r_0-r)/8)$, $r_4$: $(r_0-4\cdot(r_0-r)/8)$, $r_5$: $(r_0-5\cdot(r_0-r)/8)$, $r_6$: $(r_0-6\cdot(r_0-r)/8)$, and $r_7$: $(r_0-7\cdot(r_0-r)/8)$.

Figure 22:
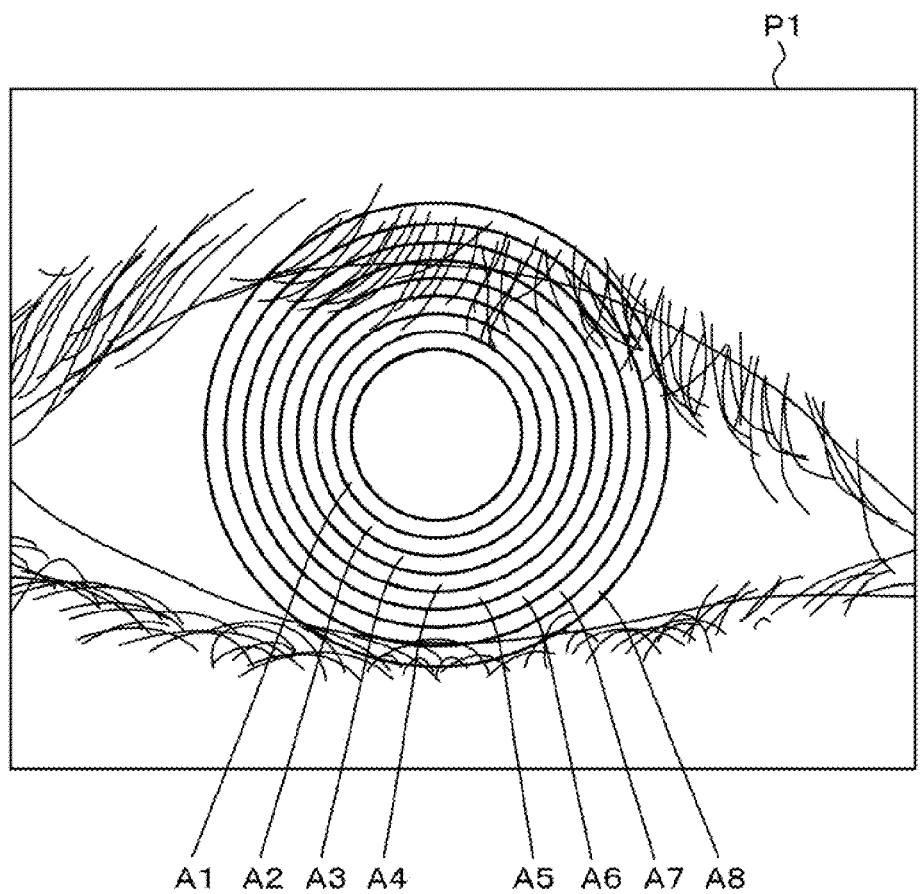
FIG. 22 is a (second) diagram for explaining an operation of the checking apparatus.

Next, as shown in FIG. 21, the checking apparatus 50 defines seven circles Cq(1) to Cq(7) to the region defined by the circle Cq(0) and the circle C(4) based on the centers $Q_1$ to $Q_7$ calculated as explained above and the calculation results of the radii $r_1$ to $r_7$. Hence, as shown in FIG. 22, the image of iris included in the image P1 is divided into eight annular regions A1 to A8 by the seven circles Cq(1) to Cq(7).

Next, the checking apparatus 50 divides each of the eight annular regions A1 to A8 into 256 micro regions for example. More specifically, respective circumferences of the circle C(4) and the circles Cq(1) to Cq(7) are divided into 256 arcs having the same central angle. Next, each micro region is generated by defining a pair of arcs that are an arc of a circle (e.g, the circle C(4)) and an arc of another circle adjoining to that circle (e.g., the circle Cq(7)) corresponding to that arc, and line segments that connect both ends of both arcs. This operation will be explained with reference to FIG. 23.

Figure 23:
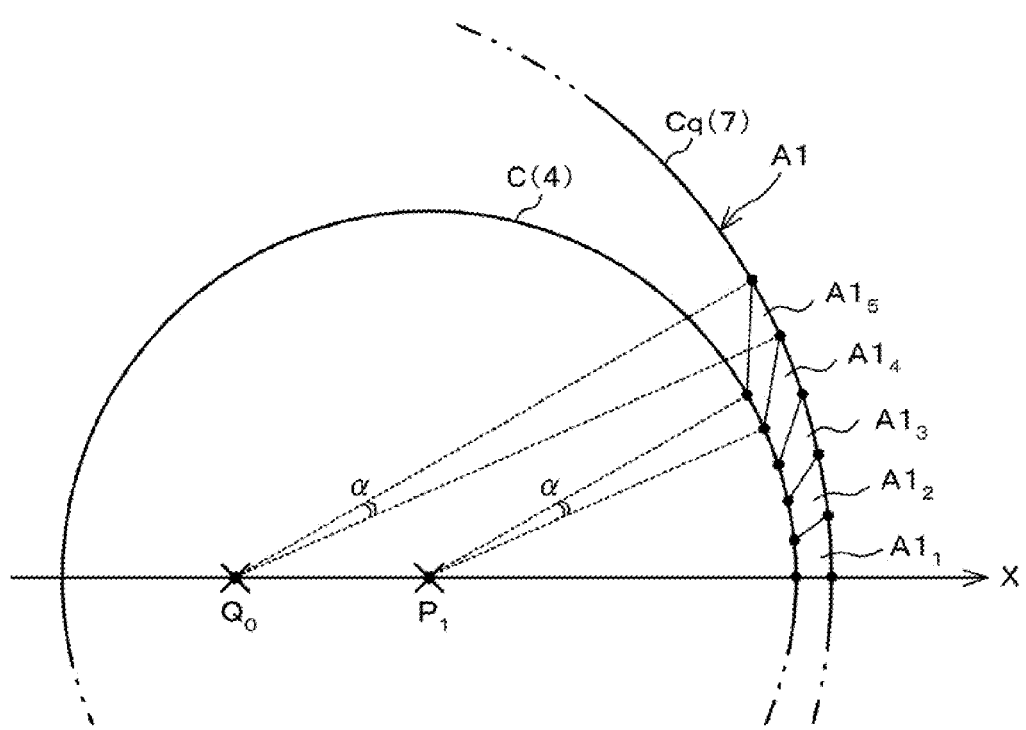
FIG. 23 is a (third) diagram for explaining an operation of the checking apparatus.

FIG. 23 shows how the annular region A1 defined by the circle C(4) and the circle Cq(7) is divided into 256 micro regions. As shown in FIG. 23, the checking apparatus 50 divides respective circles C(4) and Cq(7) into arcs having a central angle of $\alpha(360/256)$ from intersections between respective circles and the X axis, and defines line segments that connect both ends of arcs in a corresponding relationship, thereby dividing the annular region A1 into 256 micro regions $A1_1$ to $A1_{256}$. Likewise, the checking apparatus 50 divides respective annular regions A2 to A8 into micro regions $A2_1$ to $A2_{256}$, $A3_1$ to $A3_{256}$, $A4_1$ to $A4_{256}$, $A5_1$ to $A5_{256}$, $A6_1$ to $A6_{256}$, $A7_1$ to $A7_{256}$, and $A8_1$ to $A8_{256}$.

Next, the checking apparatus 50 obtains an average value $AVG1_n$ of the brightness of pixels included in a micro region A1; (where i=1, 2, . . . 256) for each micro region $A1_1$ to $A1_{256}$ belonging to the annular region A1, and generates a code 1 [$AVG1_1$, $AVG1_2$, . . . , $AVG1_{256}$] by sequentially arranging respective average values. Likewise, the checking apparatus 50 obtains average values $AVG2_i$ to $AVG8_i$ of the brightness of pixels included in respective micro regions $A2_i$ to $A8_i$ for each annular region A2 to A8, and generates, by sequentially arranging respective average values, a code 2 [$AVG2_1$, $AVG2_2$, . . . , $AVG2_{256}$], a code 3 [$AVG3_1$, $AVG3_2$, . . . , $AVG3_{256}$], a code 4 [$AVG4_1$, $AVG4_2$, . . . , $AVG4_{256}$], a code 5 [$AVG5_1$, $AVG5_2$, . . . , $AVG5_{256}$], a code 6 [$AVG6_1$, $AVG6_2$, . . . , $AVG6_{256}$], a code 7 [$AVG7_1$, $AVG7_2$, . . . , $AVG7_{256}$], and a code 8 [$AVG8_1$, $AVG8_2$, . . . , $AVG8_{256}$]. Thereafter, the checking apparatus 50 manages the above explained codes 1 to 8 as a checking target code group.

The checking apparatus 50 stores data on a plurality of code groups each including eight codes which are generated based on an image of an iris specified by the same process as that of the image processing apparatus 30 beforehand and which are associated with specific individual information. The checking apparatus 50 checks the above-explained checking target code group with the code group stored beforehand (hereinafter, referred to as a checking code group). When a checking code group having the similarity level to the checking target code group equal to or larger than a predetermined value is specified, the checking apparatus 50 outputs the result and the individual information associated with the checking code group to the exterior. Conversely, when no checking code group having the similarity level to the target code group equal to or larger than the predetermined value is specified, the checking apparatus 50 outputs the result to the exterior.

As explained above, according to the first embodiment, the image of the pupil included in the digital image P is corrected based on the low-brightness pixels configuring the image of the pupil included in the digital image P of the eye. Accordingly, interlace noises are eliminated from the image of the pupil and the image of the iris. Moreover, based on the image of the pupil included in the corrected digital image P, a circle (e.g., the circle C(4)) matching the outer edge of the pupil is defined, and based on the image of the iris included in the corrected digital image P, a circle Cq(0) matching the outer edge of the iris is defined. Hence, the image of the iris included in the digital image P can be precisely specified, and authentication of the subject person can be carried out precisely.

More specifically, according to digital images including interlace noises, the boundary of the image of the pupil and the boundary of the image of the iris are misaligned. Hence, the radius of the circle C(4) that defines the outer edge of the pupil and that of the circle Cq(0) that defines the outer edge of the iris become larger than original radii. Accordingly, in a matching region defined by the circle C(4) that defines the outer edge of the pupil and the circle Cq(0) that defines the outer edge of the iris, the ratio of the image of the iris decreases, and the ratio of image around the image of the iris, e.g., an eyelid and an eyelash increases. That is, in the matching region, data efficient for authentication decreases, but noise components increase. According to the present invention; however, by correcting digital image, the circle C(4) that defines the outer edge of the pupil and the circle Cq(0) that defines the outer edge of the iris can be defined without being affected by interlace noises included in the digital image. As a result, it is possible to precisely specify the image of the iris included in the digital image P and thus to perform authentication of the subject person precisely.

According to the involuntary eye movement, an eyeball moves relative to the portion like an eyelid. Hence, by performing the above-explained correction, portions in the digital image P other than the image of the pupil and that of the iris include interlace noises conversely. According to the authentication apparatus of the present embodiment, however, images other than the iris pattern are not used for authentication of the subject person. Accordingly, the checking precision by the authentication apparatus does not decrease by performing the above-explained correction.

Moreover, according to the first embodiment, correction of the digital image P is performed based on only the low-brightness pixels configuring the pupil. Accordingly, in comparison with a case in which, for example, the image P is corrected in consideration of all pixels included in the digital image P, correction can be completed quickly.

Furthermore, according to the first embodiment, the reference pixel $PX_0$ is set at substantial center of the image of the pupil, and with reference to this reference pixel $PX_0$, the region APX including the pixels configuring the image of the pupil is extracted. Accordingly, correction of interlace noises can be executed while excluding the pixels configuring other portions like an eyelash, so that correction of interlace noises generated in the image of the pupil can be performed precisely.

<<Second Embodiment>>

Next, a second embodiment of the present invention will be explained with reference to FIGS. 24 and 25. The same structural element as that of the first embodiment or the equivalent thereto will be denoted by the same reference numeral, and the duplicated explanation will be omitted or simplified.

A biometric authentication apparatus 2 of the present embodiment differs from the biometric authentication apparatus 1 of the first embodiment in that an image processing apparatus 30 is realized by a similar apparatus to general computer or work station.

Figure 24:
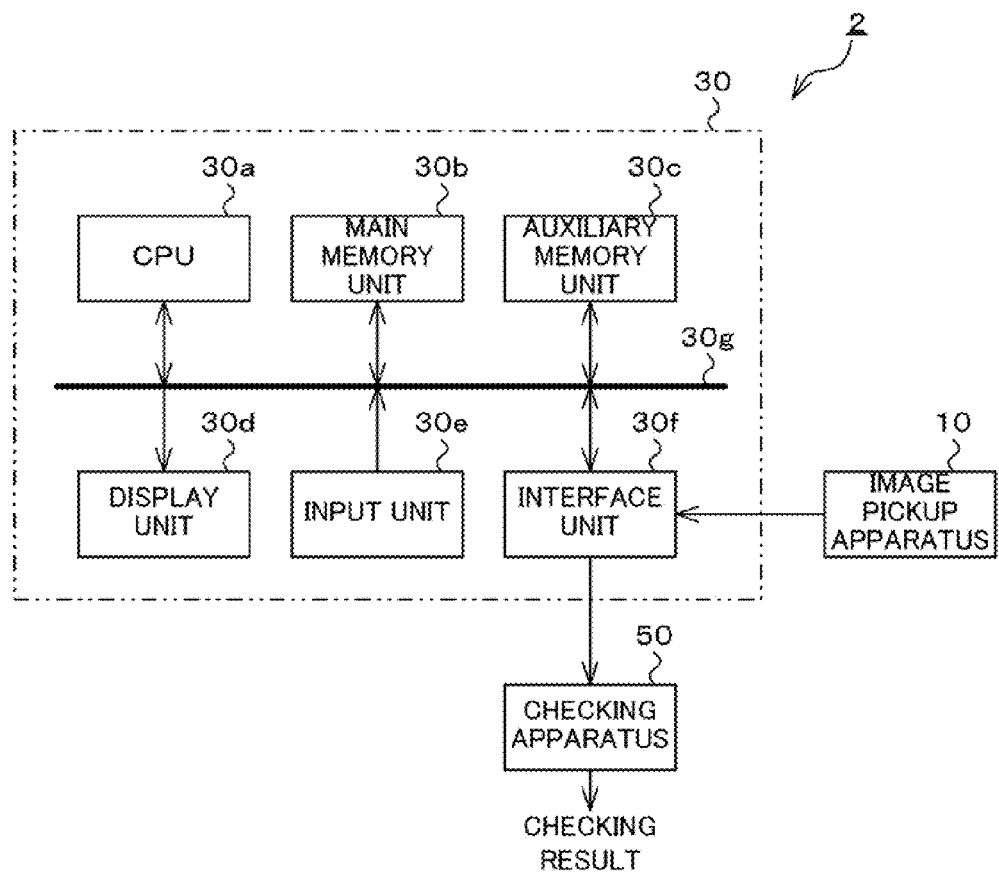
FIG. 24 is a block diagram of a biometric authentication apparatus according to a second embodiment of the present invention.

FIG. 24 is a block diagram showing a physical configuration of the biometric authentication apparatus 2. As shown in FIG. 24, the biometric authentication apparatus 2 includes the image pickup apparatus 10, an image processing apparatus 30 comprising a computer, and the checking apparatus 50.

The image processing apparatus 30 includes a CPU (Central Processing Unit) 30a, a main memory unit 30b, an auxiliary memory unit 30c, a display unit 30d, an input unit 30e, an interface 30f, and a system bus 30g that connects the above-explained units together.

The CPU 30a executes, in accordance with a program stored in the auxiliary memory unit 30c, an image processing to be discussed later on an image P picked up by the image pickup apparatus 10.

The main memory unit 30b includes a RAM (Random Access Memory), etc. The main memory unit 30b is used as a work area for the CPU 30a.

The auxiliary memory unit 30c includes a ROM (Read Only Memory), a magnetic disk, a non-volatile memory like a semiconductor memory, etc. The auxiliary memory unit 30c stores the program run by the CPU 30a and various parameters. Moreover, the auxiliary memory unit 30c stores information including a process result by the CPU 30a.

The display unit 30d includes a CRT (Cathode Ray Tube) or an LCD (Liquid Crystal Display), and the like. The display unit 30d displays a process result by the CPU 30a. In the present embodiment, every time a process is performed on the digital image P, the binary image P2, the image P3, and the like as a process result are displayed on the display unit 30d.

The input unit 30e includes pointing devices, such as a keyboard and a mouse. An instruction from an operator is input through the input unit 30e, and is transmitted to the CPU 30a through the system bus 30g.

The interface unit 30f includes a serial interface or a LAN (Local Area Network) interface, and the like. The image pickup apparatus 10 and the checking apparatus 50 are connected to the system bus 30g through the interface unit 30f.

Figure 25:
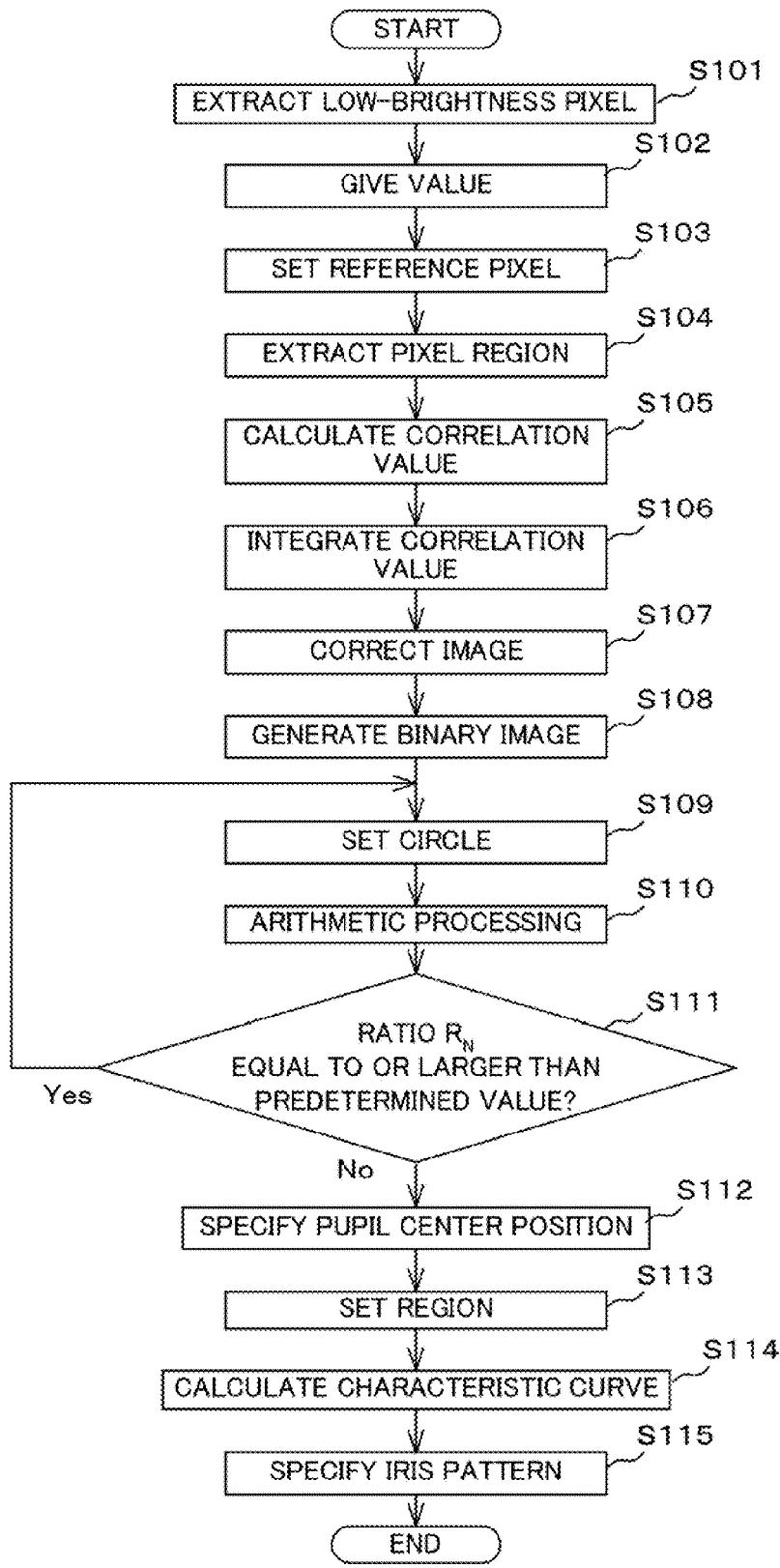
FIG. 25 is a flowchart showing an operation of an image processing apparatus.

The flowchart of FIG. 25 corresponds to successive process algorithms of the program run by the CPU 30a of the image processing apparatus 30. An image processing by the image processing apparatus 30 will be explained with reference to FIG. 25. This image processing is realized by the CPU 30a that comprehensively controls the main memory unit 30b, the auxiliary memory unit 30c, the display unit 30d, and the interface unit 30f in accordance with the program loaded from the auxiliary memory unit 30c.

First, the CPU 30a extracts low-brightness pixels having brightness equal to or smaller than a predetermined value among a plurality of pixels configuring the digital image P picked up by the image pickup apparatus 10 (step S101). More specifically, the CPU 30a extracts low-brightness pixels from the binary image P2 obtained by image conversion on the digital image P with a predetermined threshold.

Next, the CPU 30a successively selects the extracted low-brightness pixels, and gives, for example, a value 1 to each of a plurality of pixels located within a predetermined distance from the selected low-brightness pixel (step S102).

Next, the CPU 30a sets a pixel having the largest integrated value of the given values as a reference pixel $PX_0$ (step S103). As shown in FIG. 9, the position of the reference pixel. $PX_0$ substantially matches the center of the pupil of the eye indicated in the image P1.

Subsequently, the CPU 30a extracts the region APX including the low-brightness pixel group PG configuring the image of the pupil among the low-brightness pixels included in the digital image P (step S104).

Next, the CPU 30a calculates a correlation value (step S105). More specifically, the CPU 30a moves the second line group LG2 relative to the first line group LG1 from an initial state (a state shown in FIG. 11) in +x direction indicated by an arrow a in FIG. 12A or in −x direction indicated by an arrow b in FIG. 12B pixel by pixel. Thereafter, the CPU 30a calculates, for each movement of the second line group LG2 by a pixel, a correlation value V of each low-brightness pixel belonging to the first line group LG1 configuring the image of the pupil shown in FIG. 11.

Next, the CPU 30a integrates the correlation values V calculated for respective low-brightness pixels for each displacement of the second line group LG2 relative to the first line group LG1 (step S106). Next, the CPU 30a (the integrating unit 35) associates an integrated value $V_A$ of the correlation values V with a displacement d of the second line group LG2 relative to the first line, group LG1, and outputs the associated value as an integrated value $V_A(d)$ to the CPU 30a (the correcting unit 36).

Next, the CPU 30a corrects an image (step S107). More specifically, the CPU 30a selects the smallest one among the integrated values $V_A(d)$, and specifies the displacement d associated with this integrated value $V_A(d)$. Next, the CPU 30a moves the second line group LG2 relative to the first line group LG1 configuring the digital image P by a distance d, thereby correcting the digital image P.

Next, the CPU 30a performs image conversion on the corrected digital image P using a predetermined threshold, thereby generating the binary image P4 (step S108).

Next, the CPU 30a sets circles (step S109). In this step, the CPU 30a sets a circle C(1) around the reference pixel $PX_0$ and a circle C(2) having a larger radius than that of the circle C(1) on the binary image P4.

Subsequently, the CPU 30a performs an arithmetic processing (step S110). More specifically, first, the CPU 30a calculates respective areas $S_1$ and $S_2$ of the circles C(1) and C(2), and the number of low-brightness pixels $N_1$ and $N_2$ present inwardly of respective circles C(1) and C(2). Thereafter, the CPU 30a calculates a ratio $R_N$ (in the present embodiment, $R_1$ ($=(N_2-N_1)/(S_2-S_1)$)) of the number of low-brightness pixels in respective circles $(N_2-N_1)$ relative to the difference in the areas of respective circles C(1) and C(2) $(S_2-S_1)$.

Next, the CPU 30a determines whether or not the ratio $R_N$ is equal to or larger than a predetermined value (step S111). When the ratio $R_N$ is equal to or larger than the predetermined value (step S111: YES), the CPU 30a returns the process to the step S109.

In this case, the CPU 30a additionally sets a circle C(3) having a larger radius than that of the circle C(2) (step S109). Next, the CPU 30a calculates respective areas $S_2$ and $S_3$ of the circles C(2) and C(3), and the number of low-brightness pixels $N_2$ and $N_3$ present inwardly of respective circles C(2) and C(3), and calculates a ratio $R_2$ ($(N_3-N_2)/(S_3-S_2)$) of the number of low-brightness pixels in respective circles $(N_3-N_2)$ relative to the difference in the areas of respective circles C(2) and C(3) $(S_3-S_2)$ (step S110). Thereafter, the processes from the step S109 to the step S111 are repeated until the ratio $R_N$ becomes lower than the predetermined value (step S111: NO).

When the ratio $R_N$ becomes smaller than the predetermined value (step S111: NO), the CPU 30a progresses the process to step S112. For example, as shown in FIG. 16, when a circle C(4) out of the region defined by the pixel groups PG1 and PG2 is set, the determination in the step S111 becomes a negative result.

Next, the CPU 30a specifies the center position of the pupil (step S112). The CPU 30a searches a center position $P_1$ of the circle C(4) when the number of low-brightness pixels included in the circle C(4) becomes maximum while moving the circle C(4) with reference to the reference pixel $PX_0$, and specifies the searched position $P_1$ as the center position of the pupil.

Next, the CPU 30a sets a region (step S113). In this step, the CPU 30a defines an XY coordinate system with the position $P_1$ being an origin on the image P1, and defines triangular regions F1 and F2 defined by straight lines L1 and L2 having an angle relative to the X axis which is 15 degrees with the position $P_1$ on the image P1 being as an origin. Next, as shown in FIG. 19A, the CPU 30a divides the region F1 by a plurality of arcs having a central angle that is an angle defined by the X axis and the straight line L1, thereby setting a plurality of micro regions in an arcuate shape. Moreover, the CPU 30a divides the region F2 by a plurality of arcs having a central angle that is an angle defined by the X axis and the straight line L2, thereby setting a plurality of micro regions in an arcuate shape.

Next, the CPU 30a calculates a characteristic curve (step S114). The CPU 30a calculates an average value of the brightness of the pixels included in the micro region for each micro region belonging to the region F1 or the region F2. Next, the CPU 30a calculates a characteristic curve SL indicating a relationship between a position of a micro region over the X axis and an average value of corresponding brightness.

Next, the CPU 30a specifies an iris pattern (step S115). In this step, the CPU 30a obtains X coordinates A and D of intersections each between the X axis and the outer edge of the iris based on the change level of the characteristic curve SL. The CPU 30a specifies that the image of the iris is present in the region (see FIG. 20) defined by the circle C(4) and the circle Cq(0) on the image P1. Thereafter, the CPU 30a outputs information including the specified result to the checking apparatus 50, and terminates the successive processes.

The checking apparatus 50 divides the image of the iris specified by the image processing apparatus 30 into eight annular regions A1 to A8. Next, the checking apparatus 50 further divides each of the annular regions A1 to A8 into 256 micro regions.

Next, the checking apparatus 50 obtains respective average values of brightness $AVG1_i$ to $AVG8_i$ of the pixels included in the micro regions $A1_i$ to $A8_i$ for each annular region A1 to A8, and generates a checking target code group including codes 1 to 8 having those average values arranged sequentially.

Next, the checking apparatus 50 checks the checking target code group with each of a plurality of code groups each including eight codes associated with specific individual information obtained beforehand. When a checking code group having the similarity level to the checking target code group equal to or larger than a predetermined value is specified, the checking apparatus 50 outputs the result and the individual information associated with the checking code group to the exterior. Conversely, when no checking code group having the similarity level to the target code group equal to or larger than the predetermined value is specified, the checking apparatus 50 outputs the result to the exterior.

As explained above, according to the second embodiment, the image of the pupil included in the digital image P is corrected based on the low-brightness pixels configuring the image of the pupil included in the digital image P of the eye. Accordingly, interlace noises are eliminated from the image of the pupil and the image of the iris. Next, based on the image of the pupil included in the corrected digital image P, a circle (e.g., the circle C(4)) matching the outer edge of the pupil is defined, and based on the image of the iris included in the corrected digital image P, the circle Cq(0) matching the outer edge of the iris is defined. Hence, the image of the iris included in the digital image P can be precisely specified, and precise authentication of the subject person is enabled.

Moreover, according to the second embodiment, the correction of the digital image P is performed based on only the low-brightness pixels configuring the pupil. Hence, in comparison with a case in which, for example, the correction of the image P is performed in consideration of all pixels included in the digital image P, the correction can be completed quickly.

Although the embodiments of the present invention were explained above, the present invention is not limited to each of the foregoing embodiments.

For example, in respective foregoing embodiments, the explanation was given with reference to the digital image P having interlace noises produced in the x axis direction due to a movement of an eyeball in the x axis direction because of an involuntary eye movement. However, the present invention is not limited to such a case. The present invention can be applied to a correction of interlace noises produced when, for example, the eyeball moves in a direction intersecting with the x axis direction because of an involuntary eye movement.

Figure 26:
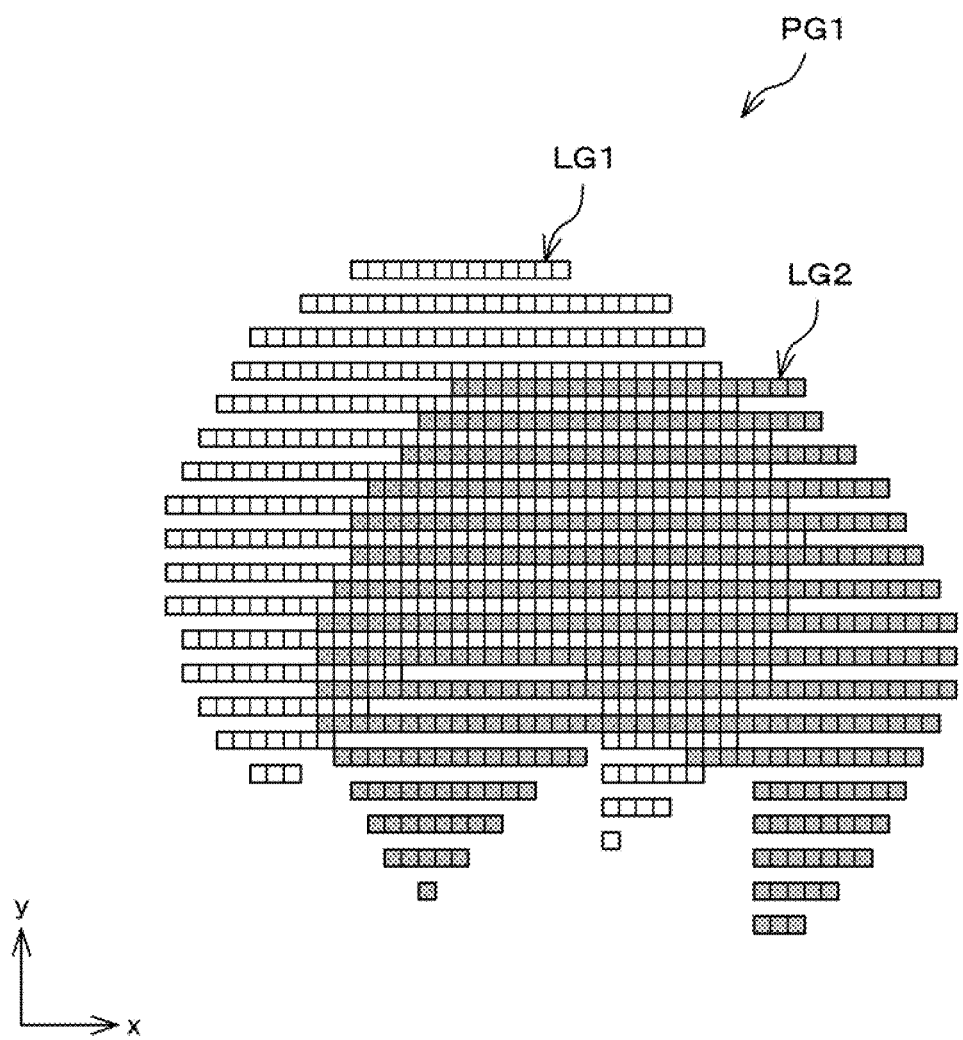
FIG. 26 is a diagram for explaining a modified example of an image processing apparatus.

As an example, FIG. 26 shows a first line group LG1 and a second line group LG2 configuring the image of a pupil included in a digital image picked up when an eyeball moves in a direction intersecting with the x axis because of an involuntary eye movement. In this case, the image processing apparatus 30 moves the second line group LG2 relative to the first line group LG1 in the x axis direction pixel by pixel, and in the y axis direction two pixels by two pixels. At the same time, the image processing apparatus 30 calculates a correlation value for each low-brightness pixel belonging to the first line group LG1 configuring the image of the pupil every time the second line group LG2 is moved in the x axis direction pixel by pixel and in the y axis direction two pixels by two pixels. Next, the image processing apparatus 30 integrates the correlation values V calculated for respective low-brightness pixels for each displacement of the second line group LG2 relative to the first line group LG1, and specifies a displacement $d_x$ in the x axis direction and a displacement $d_y$ in the y axis direction when the integration result becomes minimum. Thereafter, the image processing apparatus 30 moves the second line group LG2 in the x axis direction by the displacement $d_x$ and in the y axis direction by the displacement $d_y$ relative to the first line group LG1. Accordingly, a misalignment of information between the first line group LG1 and the second line group LG2 is corrected, and the pixels configuring the image of the pupil become a state shown in FIG. 14 from a state shown in FIG. 26.

Moreover, in respective foregoing embodiments, the image processing apparatus 30 calculates a correlation value using a differential filter, but may perform calculation by directly comparing the brightness of a low-brightness pixel $PX_{L,1}$ (B2) belonging to the first line group with respective brightness of a pixel $PX_{L,2}$ (B1) and a pixel $PX_{L,2}$ (B3) both belonging to the second line group.

The limit of the distance of moving the second line group LG2 relative to the first line group LG1 in respective foregoing embodiments can be set in accordance with the resolution of the image pickup apparatus 10, a distance between the image pickup apparatus 10 and the subject person, and the like. Information on this limit may be stored in the calculating unit 34 beforehand as a parameter.

In respective foregoing embodiments, the second line group LG2 is moved relative to the first line group LG1, but the present invention is not limited to this case, and the first line group LG1 may be moved relative to the second line group LG2. Moreover, relative to a line group including a reference pixel, another line group may be moved.

In respective foregoing embodiments, the correction is performed using the brightness of a pixel included in the digital image P, but the present invention is not limited to this configuration, and the brightness of a pixel included in the binary image P2 may be used. In this case, a correlation value can be calculated by setting the brightness of a low-brightness pixel $PX_{L,1}$ (B2) belonging to the first line group LG1 as 0 and by setting respective brightness of a pixel $PX_{L,2}$ (B1) and a pixel $PX_{L,2}$ (B3) adjacent to the low-brightness pixel $PX_{L,1}$ (B2) and belonging to the second line group as 0 or 1.

In respective foregoing embodiments, the correction is performed using the image having a low-brightness pixel that is a pixel configuring the pupil, but the present invention can be applied to an image having inverted darkness and brightness by an image processing. In this case, a correction level can be set using the absolute value of the integrated value $V_A$.

In respective foregoing embodiments, 256 micro regions are set by dividing respective annular regions A1 to A8, but the present invention is not limited to this configuration, and a rectangular region formed by connecting both ends of a pair of arcs corresponding to each other of adjoining circles may be set along respective annular regions A1 to A8.

In respective foregoing embodiments, the image processing apparatus 30 extracts a low-brightness pixel through an image conversion of the digital image P into the binary image P2, but the present invention is not limited to this configuration, and a low-brightness pixel may be directly extracted based on the brightness of a pixel configuring the digital image P.

The function of the image processing apparatus 30 in respective foregoing embodiments can be realized by an exclusive hardware or a general computer system.

The program stored in the auxiliary memory unit 30c of the image processing apparatus 30 in the second embodiment may be stored in a computer-readable recording medium, such as a flexible disk, a CD-ROM (Compact Disk Read-Only Memory), a DVD (Digital Versatile Disk), and an MO (Magneto-Optical disk) and distributed, and may be installed in a computer, thereby configuring an apparatus that executes the above-explained processes.

The above-explained program may be stored in a disk device, etc., of a predetermined server device over a communication network like the Internet, and may be superimposed on a carrier wave in order to download the program in a computer.

The above-explained program may be activated and run while being transferred through a communication network.

All portions of or a part of the above-explained program may be run on a server device, and the above-explained image processing may be executed while exchanging information on the process through a communication network.

When an OS (Operating System) shares the accomplishment of the above-explained function or when the OS and an application work together to realize the above-explained function, portions other than the OS may be stored in a medium and distributed, or may be downloaded to a computer.

It should be understood that the present invention can be changed and modified in various forms without departing from the broad scope and spirit of the present invention. The above-explained embodiments are for explaining the present invention, and are not for limiting the present invention. The scope and spirit of the present invention should be indicated by appended claims rather than the embodiments. Various changes and modifications within the scope and spirit of the present invention and an equivalent thereto should be included within the present invention.

INDUSTRIAL APPLICABILITY

The image processing apparatus, the biometric authentication apparatus, the image processing method and the recording medium of the present invention are appropriate for correction of interlace noises included in the image of an eye. Moreover, the biometric authentication apparatus of the present invention is appropriate for an authentication using the pattern of an iris.

DESCRIPTION OF REFERENCE NUMBERAL 1, 2 Biometric authentication apparatus
10 Image pickup apparatus
30 Image processing apparatus
30a CPU
30b Main memory unit
30c Auxiliary memory unit
30d Display unit
30e Input unit
30f Interface unit
30g System bus
31 Low-brightness pixel extracting unit
32 Reference pixel setting unit
33 Pixel region extracting unit
34 Calculating unit
35 Integrating unit
36 Correcting unit
37 Binary image generating unit
38 Pupil-center-position specifying unit
39 Region setting unit
40 Iris pattern specifying unit
50 Checking apparatus
P Digital image
P1 Image
P2, P4 Binary image
P3 Image
PX Pixel
$PX_0$ Reference pixel
PG1 Low-brightness pixel group
PG2 High-brightness pixel group
F1, F2 Region
A1 to A8 Annular region
C, Cq Circle
LG1 First line group
LG2 Second line group

The invention claimed is:

1. A biometric authentication apparatus that performs authentication using a pattern of an iris, comprising:
hardware, including a processor;
an image pickup apparatus;
an image processing apparatus that corrects an image of a pupil of an eye defined by a plurality of lines belonging to a first line group and a second line group located adjacent to each other, the first line group and the second line group being in an odd-numbered field and an even-numbered field in the horizontal direction, respectively, the image being picked up through an interlaced scheme, the image processing apparatus comprising:
a low-brightness pixel extracting unit implemented at least by the hardware and that extracts low-brightness pixels each having a brightness equal to or smaller than a predetermined value among a plurality of pixels configuring a digital image output by the image pickup apparatus;
a reference pixel setting unit implemented at least by the hardware and that successively selects the low-brightness pixels, and gives a predetermined value to each of the plurality of pixels, integrates the predetermined value, and sets a pixel having a largest integrated value of the predetermined value as a reference pixel;
a pixel region extracting unit implemented at least by the hardware and that extracts, around the reference pixel, a region including a low-brightness pixel group configuring the image of the pupil among the low-brightness pixels included in the digital image;
a calculating unit implemented at least by the hardware and which moves the second line group configuring the low-brightness pixel group relative to the first line group by a predetermined amount, and calculates, for each pixel belonging to the first line group, a difference in brightness between a pixel belonging to the first line group and a pixel belonging to the second line group and adjacent to the pixel belonging to the first line group;
an integrating unit implemented at least by the hardware and that integrates brightness differences calculated pixel by pixel; and
a correcting unit implemented at least by the hardware and that corrects misalignment between the first line group and the second line group based on a relative displacement of the second line group to the first line group when an absolute value of an integrated value obtained by the integrating unit becomes minimum, wherein the image processing apparatus executes a correction process on the digital image output by the image pickup apparatus; and
a processing apparatus implemented at least by the hardware and that performs biometric authentication using the digital image corrected by the image processing apparatus.

2. An image processing method that corrects a digital image of a pupil of an eye defined by a plurality of lines belonging to a first line group and a second line group located adjacent to each other, the image being picked up through an interlaced scheme and the image processing method comprising:
a step of extracting a low-brightness pixels each having a brightness equal to or smaller than a predetermined value among a plurality of pixels configuring a digital image;
a step of successively selecting the low-brightness pixels, and giving a predetermined value to each of the plurality of pixels, integrating the predetermined value, and setting a pixel having a largest integrated value of the predetermined value as a reference pixel;
extracting, around the reference pixel, a region including a low-brightness pixel group configuring the image of the pupil among the low-brightness pixels included in the digital image;
a step of moving the second line group configuring the low-brightness pixel group relative to the first line group by a predetermined amount, and of calculating, for each pixel belonging to the first line group, a difference in brightness between a pixel belonging to the first line group and a pixel belonging to the second line group and adjacent to the pixel belonging to the first line group;
a step of integrating brightness differences calculated pixel by pixel;
a step of correcting within the digital image misalignment between the first line group and the second line group based on a relative displacement of the second line group to the first line group when an absolute value of an integrated value of the brightness differences becomes minimum; and
a step of performing biometric authentication using the corrected digital image.

3. A non-transitory computer-readable recording medium storing a program that when executed by a computer causes the computer to perform a method that corrects a digital image of a pupil of an eye defined by a plurality of lines belonging to a first line group and a second line group located adjacent to each other, the image being picked up through an interlaced scheme and the image processing method comprising:
a step of extracting a low-brightness pixels each having a brightness equal to or smaller than a predetermined value among a plurality of pixels configuring a digital image;
a step of successively selecting the low-brightness pixels, and giving a predetermined value to each of the plurality of pixels, integrating the predetermined value, and setting a pixel having a largest integrated value of the predetermined value as a reference pixel;
extracting, around the reference pixel, a region including a low-brightness pixel group configuring the image of the pupil among the low-brightness pixels included in the digital image;
a step of moving the second line group configuring the low-brightness pixel group relative to the first line group by a predetermined amount, and of calculating, for each pixel belonging to the first line group, a difference in brightness between a pixel belonging to the first line group and a pixel belonging to the second line group and adjacent to the pixel belonging to the first line group;
a step of integrating brightness differences calculated pixel by pixel;
a step of correcting within the digital image misalignment between the first line group and the second line group based on a relative displacement of the second line group to the first line group when an absolute value of an integrated value of the brightness differences becomes minimum; and
a step of performing biometric authentication using the corrected digital image.

4. The image processing apparatus according to claim 1, wherein the reference point is located at a substantial center of the image of the pupil of the eye.

5. The image processing apparatus according to claim 1, wherein the calculating unit detects the difference in brightness using a differential filter for each pixel.

6. The image processing apparatus according to claim 1, wherein the digital image is a binary image.

* * * * *